United States Patent
Shibata et al.

(10) Patent No.: US 9,916,798 B2
(45) Date of Patent: Mar. 13, 2018

(54) LIQUID CRYSTAL DISPLAY DEVICE AND METHOD OF DRIVING THE SAME

(71) Applicant: Japan Display Inc., Minato-ku (JP)

(72) Inventors: Takeshi Shibata, Tokyo (JP); Yoshihiro Kotani, Tokyo (JP); Hiroshi Mizuhashi, Tokyo (JP); Hayato Kurasawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 72 days.

(21) Appl. No.: 15/086,852

(22) Filed: Mar. 31, 2016

(65) Prior Publication Data
US 2016/0307526 A1 Oct. 20, 2016

(30) Foreign Application Priority Data

Apr. 17, 2015 (JP) .................. 2015-085189

(51) Int. Cl.
*G09G 3/36* (2006.01)
*G02F 1/13* (2006.01)

(52) U.S. Cl.
CPC ............ *G09G 3/3614* (2013.01); *G02F 1/13* (2013.01); *G09G 3/3648* (2013.01); *G09G 3/3688* (2013.01); *G09G 2300/0426* (2013.01); *G09G 2300/0434* (2013.01); *G09G 2310/0248* (2013.01); *G09G 2310/0297* (2013.01); *G09G 2310/08* (2013.01); *G09G 2354/00* (2013.01)

(58) Field of Classification Search
CPC .. G09G 3/3614; G09G 3/3648; G09G 3/3688; G09G 3/3677; G09G 2300/0426; G09G 2310/08; G02F 1/13; G02F 1/1368; G06F 3/044; G06F 3/0418

USPC ......................................................... 345/209
See application file for complete search history.

(56) References Cited

U.S. PATENT DOCUMENTS

| 5,519,521 A * | 5/1996 | Okimoto ............... G02F 1/1368 349/42 |
| 2010/0085335 A1* | 4/2010 | Kato .................... G09G 3/3677 345/204 |
| 2011/0267293 A1 | 11/2011 | Noguchi et al. |
| 2012/0050659 A1 | 3/2012 | Nakanishi et al. |

(Continued)

FOREIGN PATENT DOCUMENTS

| JP | 2011-233018 | 11/2011 |
| JP | 2012-47807 | 3/2012 |

(Continued)

*Primary Examiner* — Fred Tzeng
(74) *Attorney, Agent, or Firm* — Oblon, McClelland, Maier & Neustadt, L.L.P.

(57) ABSTRACT

According to one embodiment, a liquid crystal display device includes a first substrate, a second substrate, a liquid crystal layer, and a first drive module. A first source line is located between a first divisional electrode and a second divisional electrode. One frame period includes a first display period, a second display period, a sense period, and a first pre-charge period. The first drive module supplies a first image signal having a first polarity to the first source line in the first display period, supplies a first pre-charge signal having a second polarity to the first source line in the first pre-charge period, and supplies the first image signal having the first polarity to the first source line in the second display period.

9 Claims, 17 Drawing Sheets

(56) References Cited

U.S. PATENT DOCUMENTS

| | | | |
|---|---|---|---|
| 2015/0268795 A1* | 9/2015 | Kurasawa | G06F 3/0418 345/174 |
| 2015/0310792 A1 | 10/2015 | Fukushima et al. | |
| 2015/0355766 A1 | 12/2015 | Kotani et al. | |
| 2016/0018931 A1* | 1/2016 | Kurasawa | G06F 3/044 345/174 |

FOREIGN PATENT DOCUMENTS

| | | |
|---|---|---|
| JP | 2015-206985 | 11/2015 |
| JP | 2015-230395 | 12/2015 |

\* cited by examiner

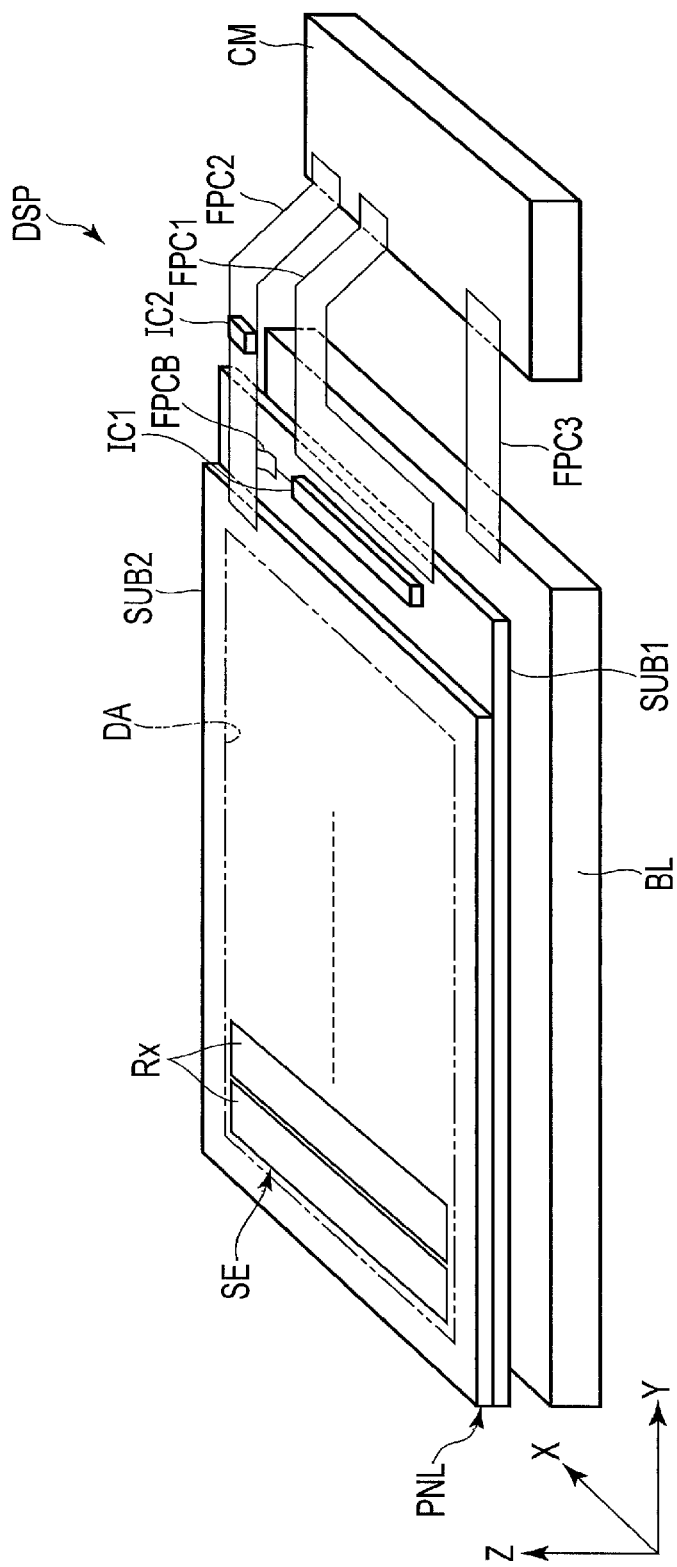
F I G. 1

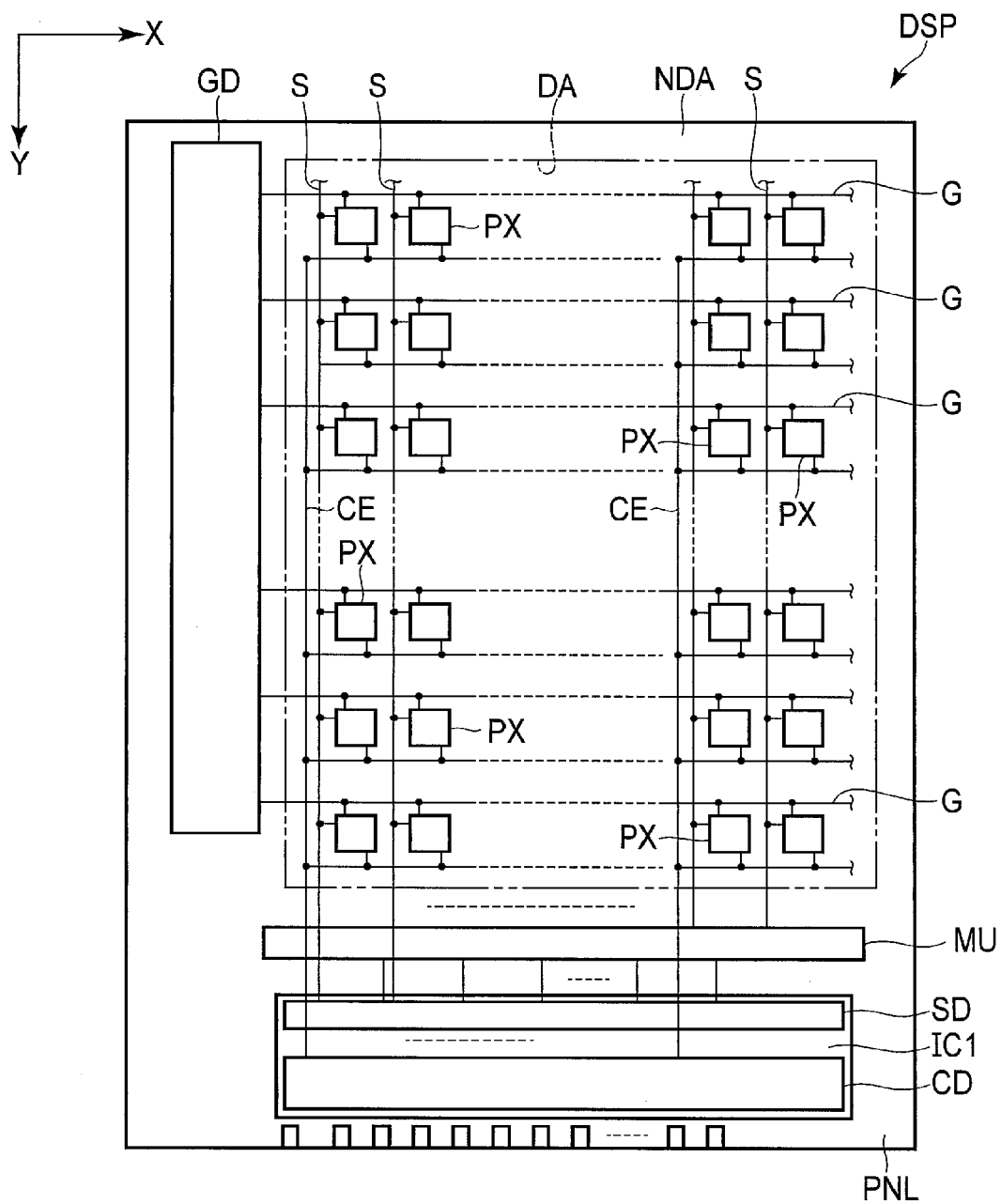
F I G. 2

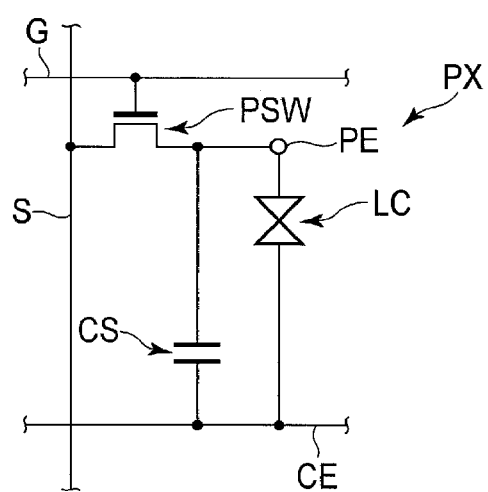
F I G. 3

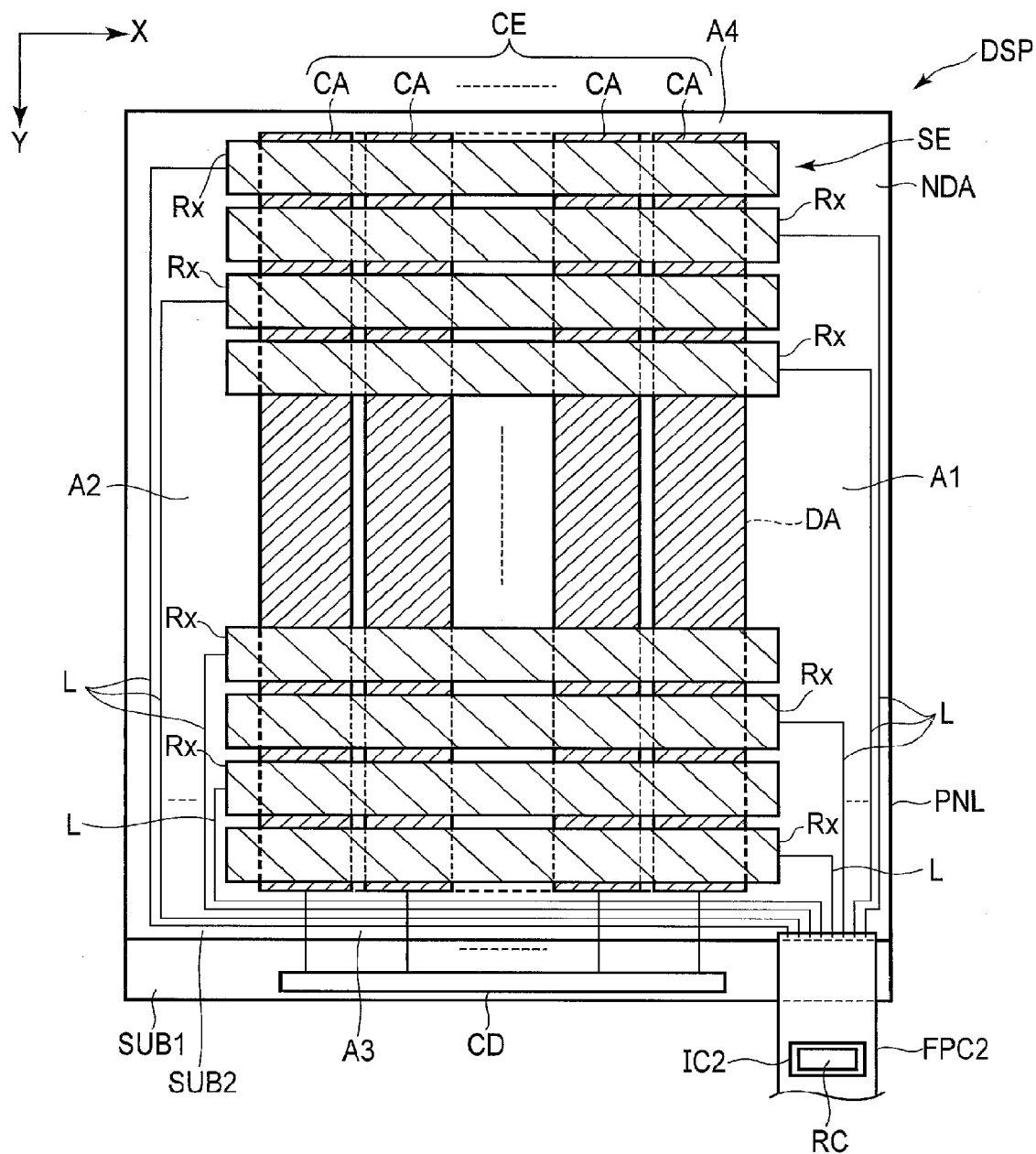
F I G. 5

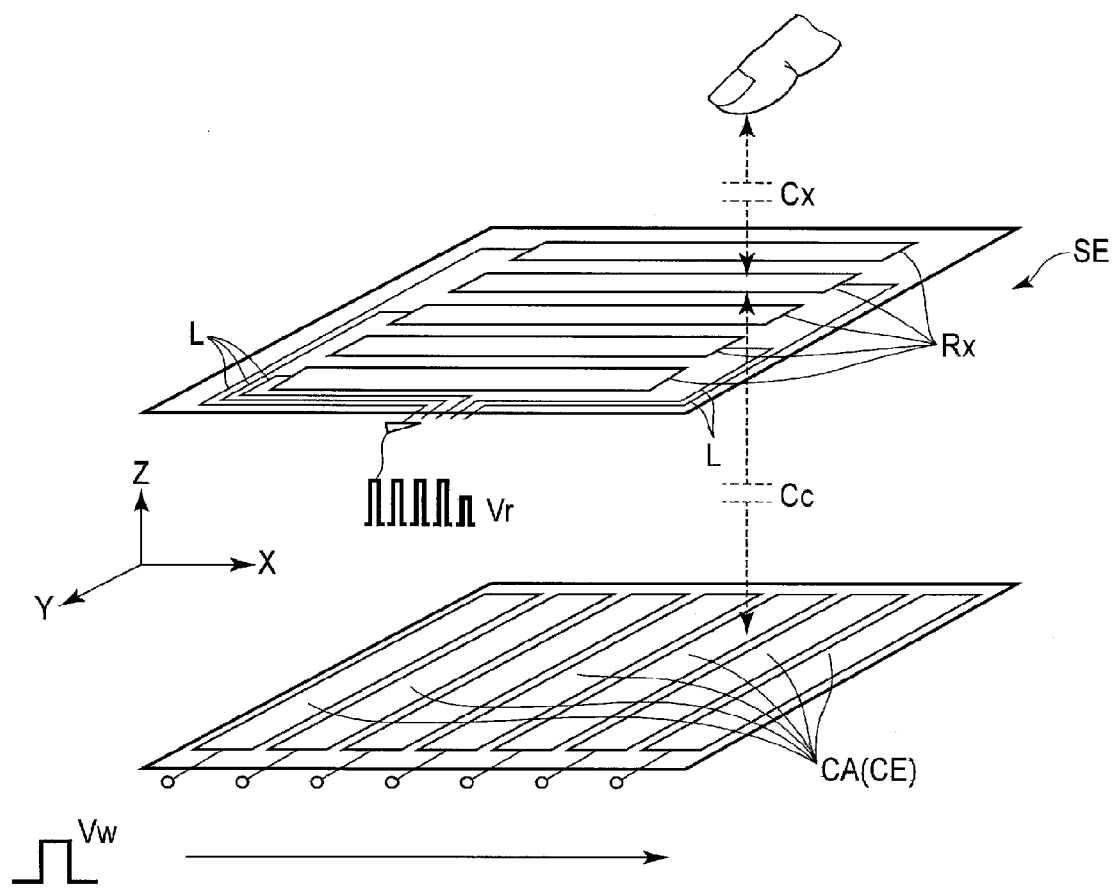
F I G. 7

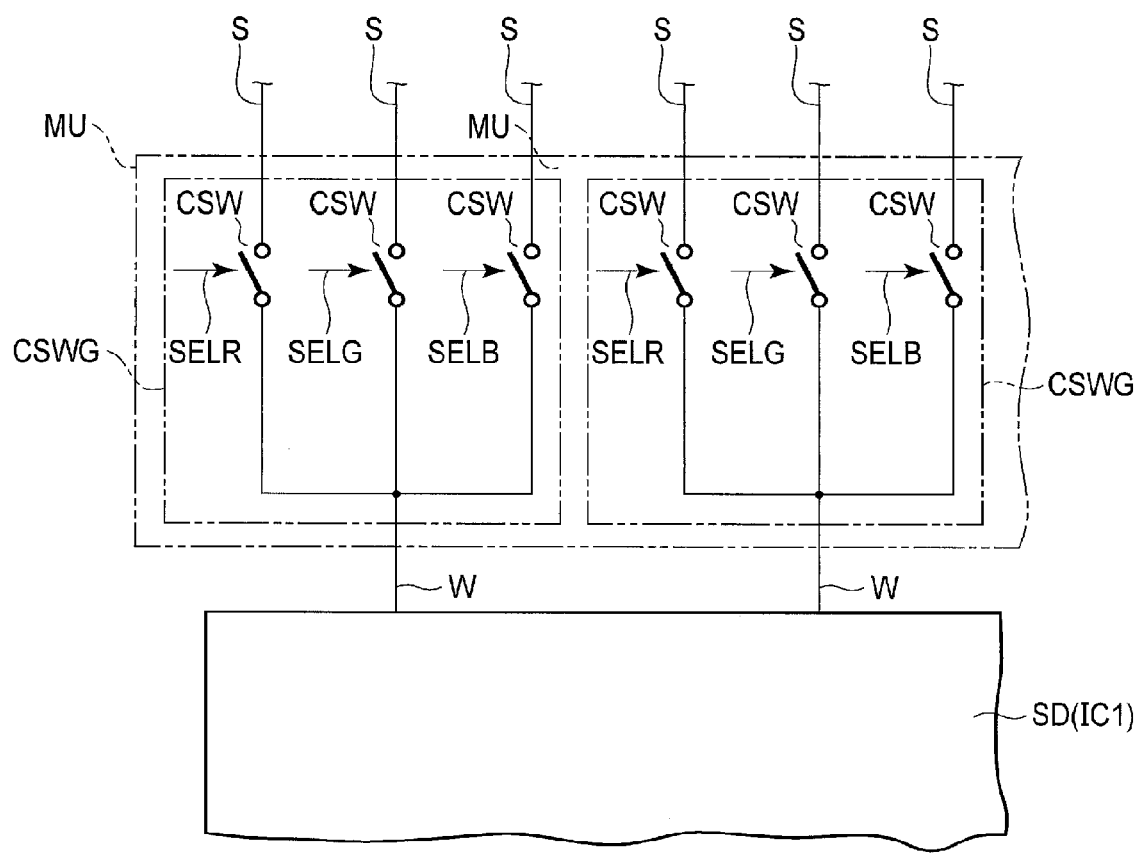
F I G. 8

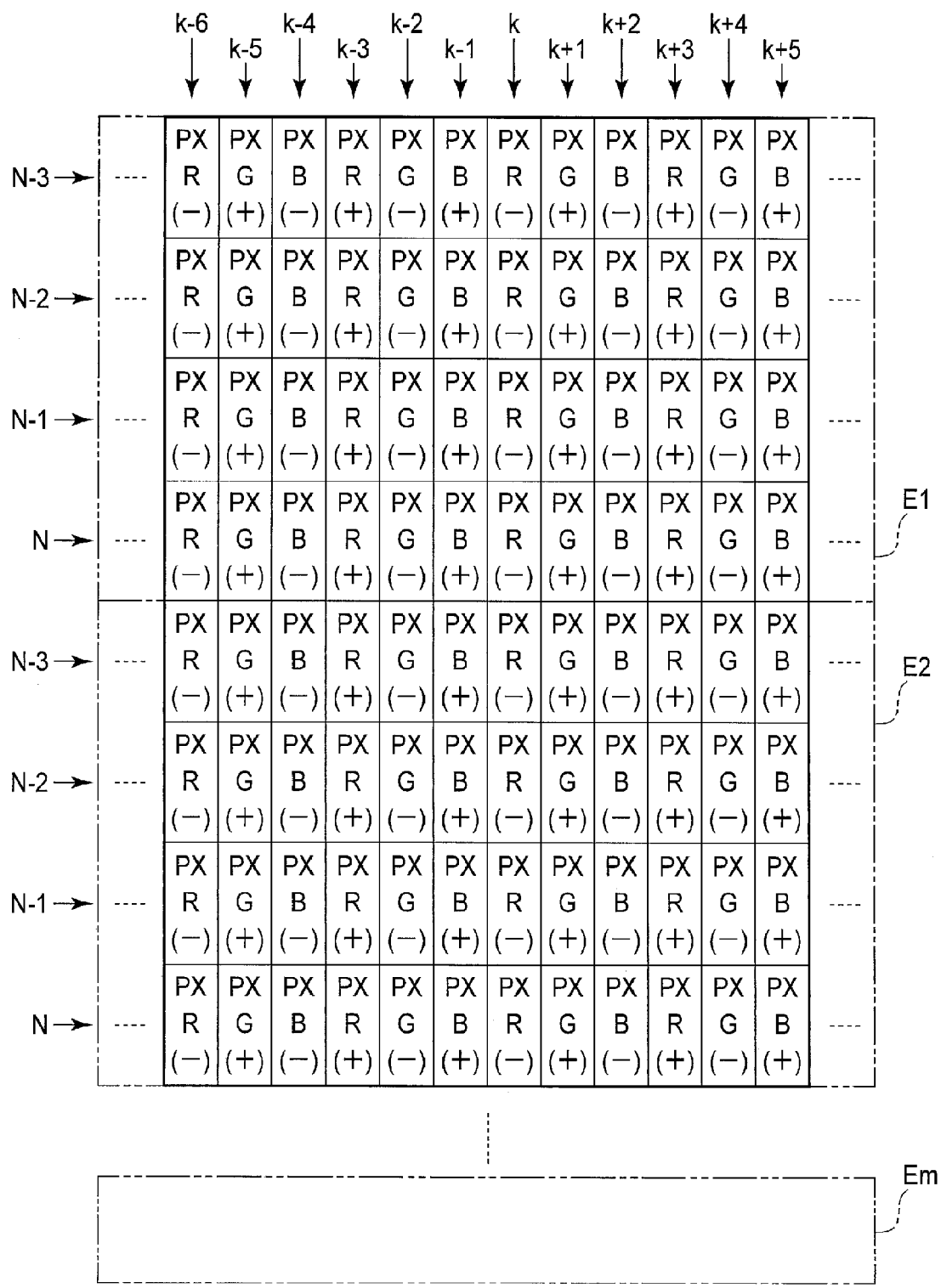
F I G. 9

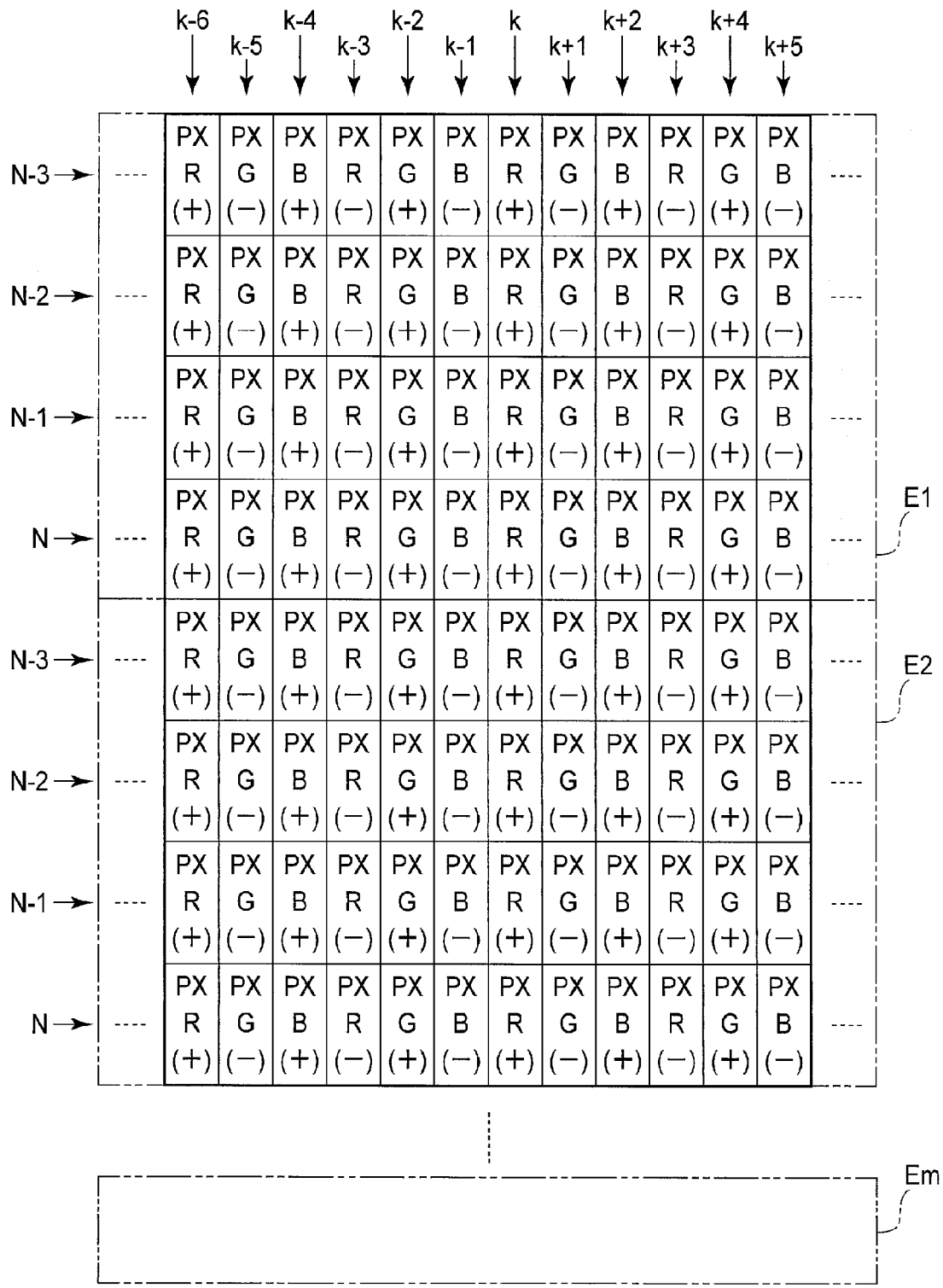
F I G. 10

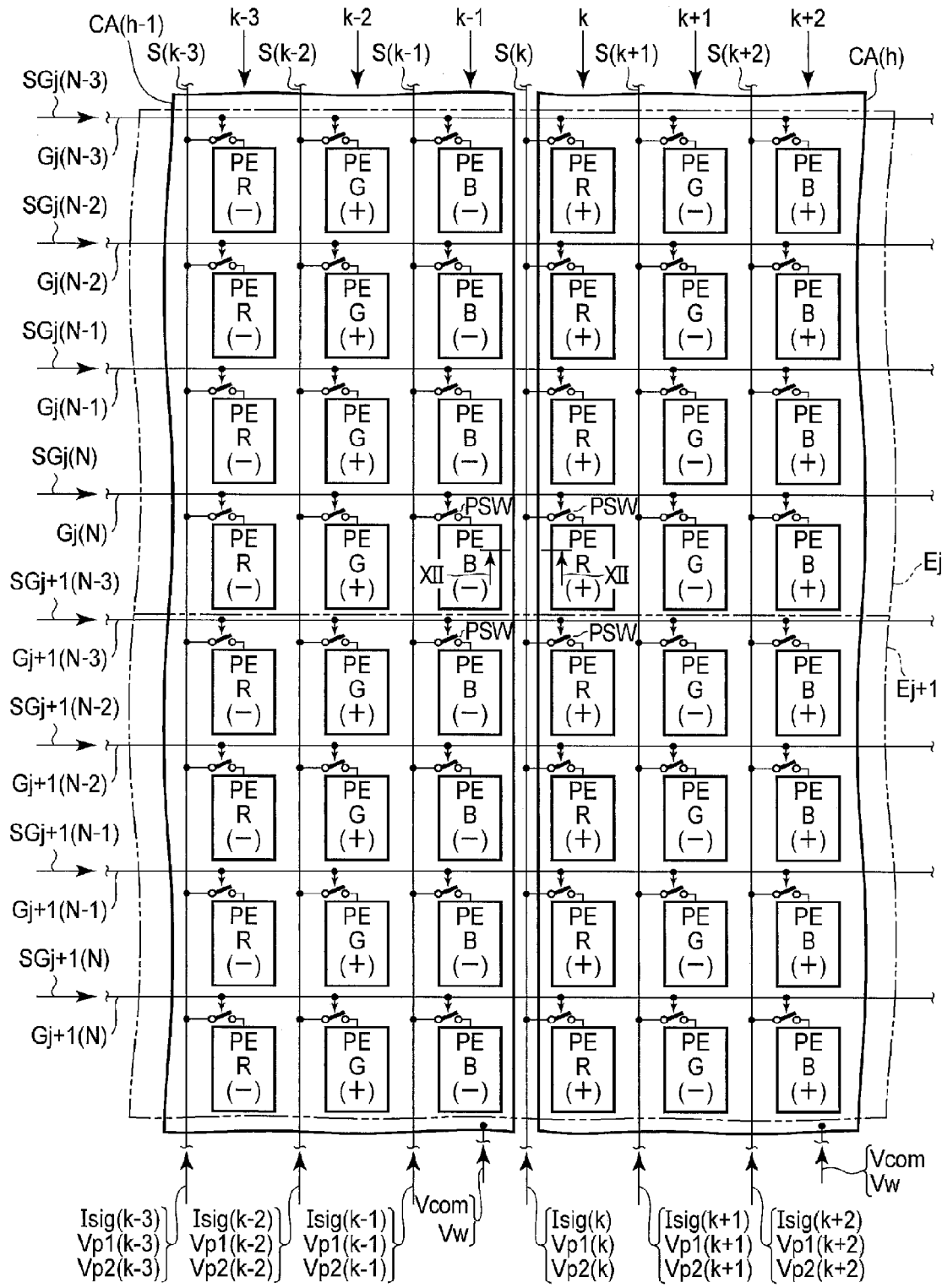
F I G. 11

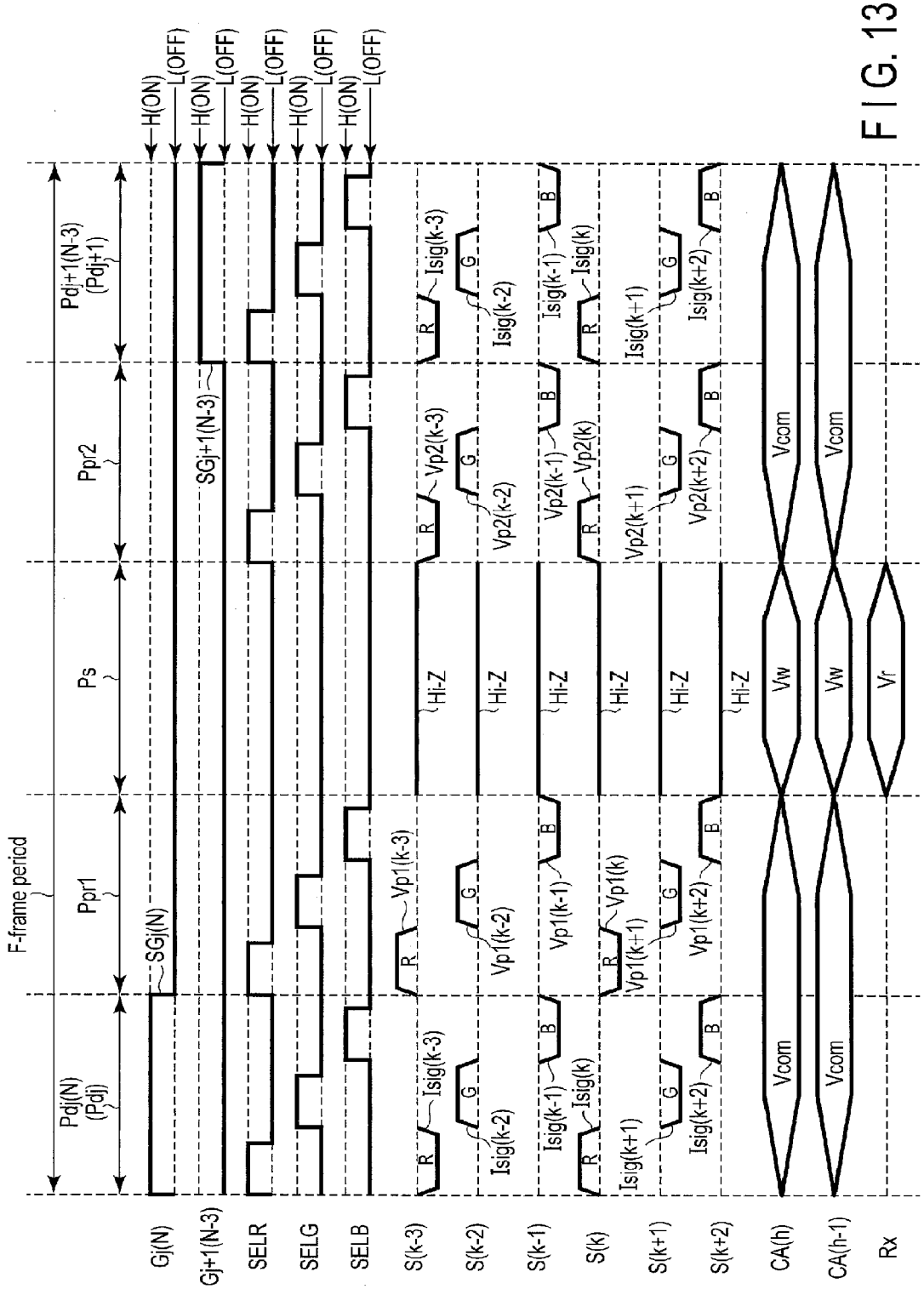
F I G. 13

| | k-6 | k-5 | k-4 | k-3 | k-2 | k-1 | k | k+1 | k+2 | k+3 | k+4 | k+5 | |
|---|---|---|---|---|---|---|---|---|---|---|---|---|---|
| N-3 → | PX R (+) | PX G (−) | PX B (+) | PX R (−) | PX G (+) | PX B (−) | PX R (+) | PX G (−) | PX B (+) | PX R (−) | PX G (+) | PX B (−) | |
| N-2 → | PX R (+) | PX G (−) | PX B (+) | PX R (−) | PX G (+) | PX B (−) | PX R (+) | PX G (−) | PX B (+) | PX R (−) | PX G (+) | PX B (−) | |
| N-1 → | PX R (+) | PX G (−) | PX B (+) | PX R (−) | PX G (+) | PX B (−) | PX R (+) | PX G (−) | PX B (+) | PX R (−) | PX G (+) | PX B (−) | E1 |
| N → | PX R (+) | PX G (−) | PX B (+) | PX R (−) | PX G (+) | PX B (−) | PX R (+) | PX G (−) | PX B (+) | PX R (−) | PX G (+) | PX B (−) | |
| N-3 → | PX R (−) | PX G (−) | PX B (+) | PX R (+) | PX G (+) | PX B (−) | PX R (−) | PX G (−) | PX B (+) | PX R (+) | PX G (+) | PX B (−) | |
| N-2 → | PX R (−) | PX G (−) | PX B (+) | PX R (+) | PX G (+) | PX B (−) | PX R (−) | PX G (−) | PX B (+) | PX R (+) | PX G (+) | PX B (−) | E2 |
| N-1 → | PX R (−) | PX G (−) | PX B (+) | PX R (+) | PX G (+) | PX B (−) | PX R (−) | PX G (−) | PX B (+) | PX R (+) | PX G (+) | PX B (−) | |
| N → | PX R (−) | PX G (−) | PX B (+) | PX R (+) | PX G (+) | PX B (−) | PX R (−) | PX G (−) | PX B (+) | PX R (+) | PX G (+) | PX B (−) | |

Em

F I G. 15

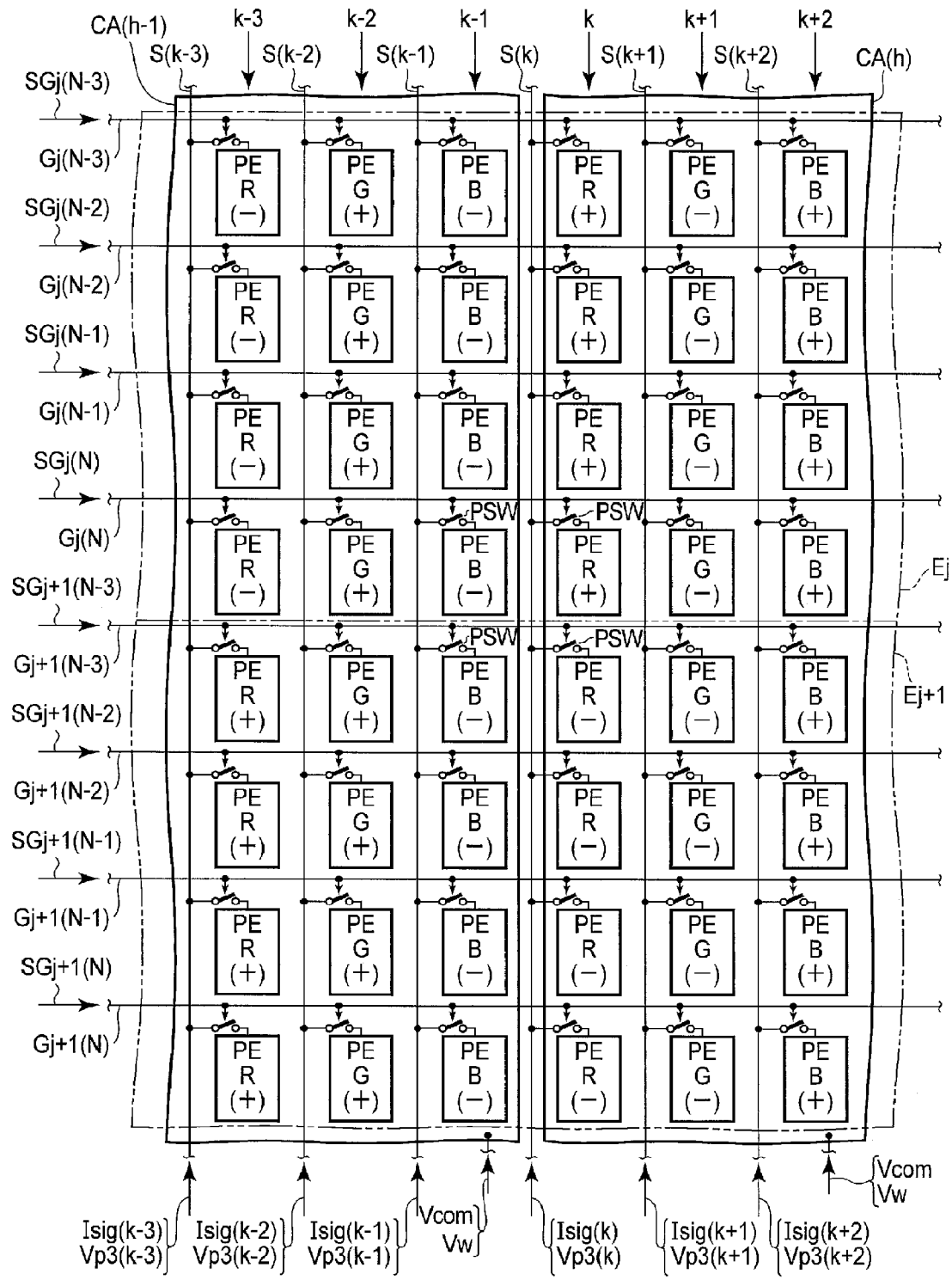
F I G. 16

LIQUID CRYSTAL DISPLAY DEVICE AND METHOD OF DRIVING THE SAME

CROSS-REFERENCE TO RELATED APPLICATIONS

This application is based upon and claims the benefit of priority from Japanese Patent Application No. 2015-085189, filed Apr. 17, 2015, the entire contents of which are incorporated herein by reference.

FIELD

Embodiments described herein relate generally to a liquid crystal display device and a method of driving the liquid crystal display device.

BACKGROUND

Currently, flat-panel display devices are being actively developed. In particular, liquid crystal display devices are attracting attention because of their advantages such as lightness, flatness and low energy consumption. Specifically, in active matrix liquid crystal display devices in which a switching element is incorporated into each pixel, a structure using a lateral electric field (including a fringe field) such as a fringe field switching (FFS) mode is attracting attention. In such a liquid crystal display device of the lateral electric field mode comprises pixel electrodes and a counter-electrode formed on an array substrate and switches liquid crystal molecules by the lateral electric field substantially parallel to a main surface of the array substrate.

SUMMARY

According to one aspect, there is provided a liquid crystal display device comprising: a first substrate comprising a common electrode including a first divisional electrode and a second divisional electrode arranged with a space between, and a first source line located between the first divisional electrode and the second divisional electrode; a second substrate opposed to the first substrate; a liquid crystal layer held between the first substrate and the second substrate; and a first drive module electrically connected to the first divisional electrode, the second divisional electrode and the first source line.

One frame period includes a first display period, a second display period following the first display period, a sense period between the first display period and the second display period, and a first pre-charge period between the first display period and the sense period. In the first display period, the first drive module supplies a common drive signal to the first divisional electrode and the second divisional electrode and supplies a first image signal having a first polarity to the first source line. In the first pre-charge period, the first drive module supplies the common drive signal to the first divisional electrode and the second divisional electrode and supplies a first pre-charge signal having a second polarity, which is different from the first polarity, to the first source line. In the sense period, the first drive module supplies a sensor drive signal to at least one of the first divisional electrode and the second divisional electrode. In the second display period, the first drive module supplies the common drive signal to the first divisional electrode and the second divisional electrode and supplies the first image signal having the first polarity to the first source line.

According to another aspect, there is provided a method of driving a liquid crystal display device, the liquid crystal display device comprising: a first substrate comprising a common electrode including a first divisional electrode and a second divisional electrode arranged with a space between, and a first source line located between the first divisional electrode and the second divisional electrode; a second substrate opposed to the first substrate; and a liquid crystal layer held between the first substrate and the second substrate.

The method comprises: in a first display period, supplying a common drive signal to the first divisional electrode and the second divisional electrode and supplying a first image signal having a first polarity to the first source line; in a first pre-charge period, supplying the common drive signal to the first divisional electrode and the second divisional electrode and supplying a first pre-charge signal having a second polarity, which is different from the first polarity, to the first source line; in a sense period, supplying a sensor drive signal to at least one of the first divisional electrode and the second divisional electrode; and in a second display period, supplying the common drive signal to the first divisional electrode and the second divisional electrode and supplying the first image signal having the first polarity to the first source line.

One frame period includes the first display period, the second display period following the first display period, the sense period between the first display period and the second display period, and the first pre-charge period between the first display period and the sense period.

BRIEF DESCRIPTION OF THE DRAWINGS

FIG. 1 is a perspective view showing a structure of a liquid crystal display device of an embodiment.

FIG. 2 is an illustration showing a basic structure and an equivalent circuit of the liquid crystal display device shown in FIG. 1.

FIG. 3 is an equivalent circuit diagram showing one of the pixels PX shown in FIG. 2.

FIG. 5 is a plan view showing a structure of a sensor of the embodiment.

FIG. 7 is an illustration showing a principle of an example of a sense method.

FIG. 8 is an enlarged plan view partially showing the first substrate of the liquid crystal display panel outside the display area including a circuit diagram showing a multiplexer.

FIG. 9 is an illustration partially showing pixels, colors expressed by the pixels and polarities of the pixels in an arbitrary $F^{th}$ frame period in an example of the embodiment.

FIG. 10 is an illustration partially showing the pixels, colors expressed by the pixels and polarities of the pixels in an arbitrary $F+1^{th}$ frame period in the example.

FIG. 11 is a circuit diagram showing pixels of an arbitrary j th target and a $j+1^{th}$ target in arbitrary six columns in the example, and showing eight gate lines, six source lines, a plurality of pixel switching elements, a plurality of pixel electrodes and two divisional electrodes.

FIG. 13 is a timing chart showing a method of driving the liquid crystal display device of the example and showing various control signals, image signals, first pre-charge signals, second pre-charge signals, a common drive signal, a write signal and a read signal in a part of the $F^{th}$ frame period.

FIG. 15 is an illustration partially showing the pixels, colors expressed by the pixels and polarities of the pixels in an arbitrary $F+1^{th}$ frame period in the comparative example.

FIG. 16 is a circuit diagram showing pixels of an arbitrary $j^{th}$ target and a $j+1^{th}$ target in arbitrary six columns in the comparative example, and showing eight gate lines, six source lines, a plurality of pixel switching elements, a plurality of pixel electrodes and two divisional electrodes.

DETAILED DESCRIPTION

Figure 4:
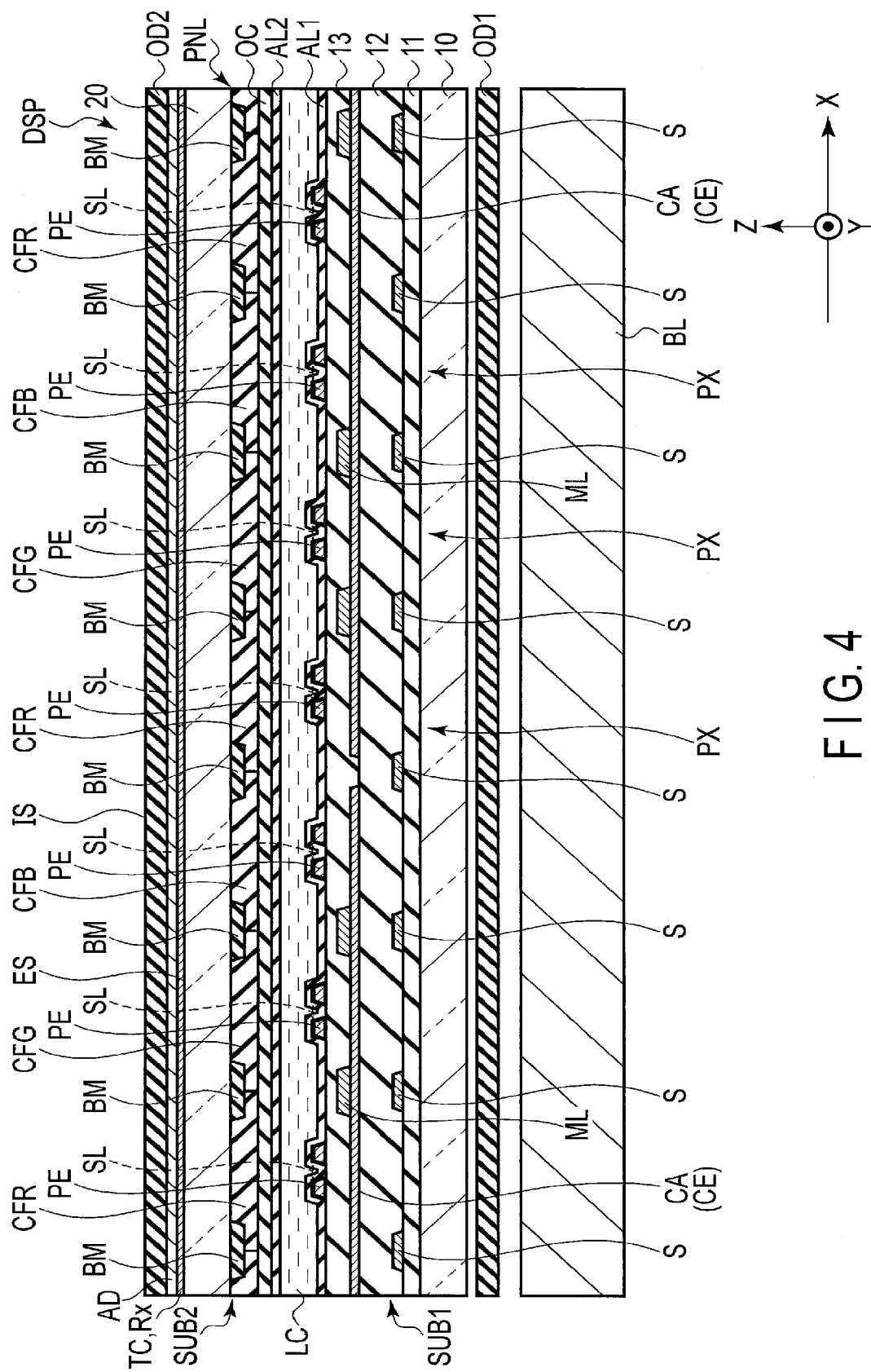
FIG. 4 is a cross-sectional view partially showing a structure of the liquid crystal display device.

In general, according to one embodiment, there is provided a liquid crystal display device comprising: a first substrate comprising a common electrode including a first divisional electrode and a second divisional electrode arranged with a space between, and a first source line located between the first divisional electrode and the second divisional electrode; a second substrate opposed to the first substrate; a liquid crystal layer held between the first substrate and the second substrate; and a first drive module electrically connected to the first divisional electrode, the second divisional electrode and the first source line, wherein one frame period includes a first display period, a second display period following the first display period, a sense period between the first display period and the second display period, and a first pre-charge period between the first display period and the sense period, in the first display period, the first drive module supplies a common drive signal to the first divisional electrode and the second divisional electrode and supplies a first image signal having a first polarity to the first source line, in the first pre-charge period, the first drive module supplies the common drive signal to the first divisional electrode and the second divisional electrode and supplies a first pre-charge signal having a second polarity, which is different from the first polarity, to the first source line, in the sense period, the first drive module supplies a sensor drive signal to at least one of the first divisional electrode and the second divisional electrode, and in the second display period, the first drive module supplies the common drive signal to the first divisional electrode and the second divisional electrode and supplies the first image signal having the first polarity to the first source line.

According to another embodiment, there is provided a method of driving a liquid crystal display device, the liquid crystal display device comprising: a first substrate comprising a common electrode including a first divisional electrode and a second divisional electrode arranged with a space between, and a first source line located between the first divisional electrode and the second divisional electrode; a second substrate opposed to the first substrate; and a liquid crystal layer held between the first substrate and the second substrate, the method comprising: in a first display period, supplying a common drive signal to the first divisional electrode and the second divisional electrode and supplying a first image signal having a first polarity to the first source line; in a first pre-charge period, supplying the common drive signal to the first divisional electrode and the second divisional electrode and supplying a first pre-charge signal having a second polarity, which is different from the first polarity, to the first source line; in a sense period, supplying a sensor drive signal to at least one of the first divisional electrode and the second divisional electrode; and in a second display period, supplying the common drive signal to the first divisional electrode and the second divisional electrode and supplying the first image signal having the first polarity to the first source line, wherein one frame period includes the first display period, the second display period following the first display period, the sense period between the first display period and the second display period, and the first pre-charge period between the first display period and the sense period.

An embodiment and a comparative example of the invention will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. In the present specification and drawings, the same elements as those in the already described drawing may be denoted by the same reference numbers and their detailed descriptions may be arbitrarily omitted.

First, a liquid crystal display device of an embodiment is described. In the present embodiment, the liquid crystal display device is a sensor-equipped liquid crystal display device. FIG. 1 is a perspective view showing a structure of the sensor-equipped liquid crystal display device of the present embodiment.

As shown in FIG. 1, a liquid crystal display device DSP comprises an active matrix liquid crystal display panel PNL, a drive IC chip IC1 which drives the liquid crystal display panel PNL, a capacitive sensor SE, a touch detection IC chip IC2 which drives the sensor SE, a backlight unit BL which illuminates the liquid crystal display panel PNL, a control module CM, flexible printed circuit boards FPC1, FPC2 and FPC3, etc. The touch detection IC chip IC2 is configured to control the touch detection.

The liquid crystal display panel PNL comprises a first substrate SUB1, a second substrate SUB2 opposed to the first substrate SUB1, and a liquid crystal layer (liquid crystal layer LC to be described later) held between the first substrate SUB1 and second substrate SUB2. Each of the first substrate SUB1 and the second substrate SUB2 may be a glass substrate or a flexible substrate such as a resin substrate. In the present embodiment, the first substrate SUB1 can be restated as an array substrate, and the second substrate SUB2 can be restated as a counter-substrate. The liquid crystal display panel PNL includes a display area (active area) DA in which an image is displayed. The liquid crystal display panel PNL is a transmissive display panel having a transmissive display function of displaying an image by selectively transmitting backlight from the backlight unit BL. The liquid crystal display panel PNL may be a transreflective display panel having a reflective display function of displaying an image by selectively reflecting outside light in addition to the transmissive display function.

The backlight unit BL is located on a back surface side of the first substrate SUB1. As the backlight unit BL, various types of unit are applicable, and a backlight unit using a light-emitting diode (LED) as a light source is also applicable. Descriptions of a detailed structure of the backlight unit BL are omitted. If the liquid crystal display panel PNL is a reflective display panel having only a reflective display function, the backlight unit BL is omitted.

The sensor SE comprises a plurality of detection electrodes Rx. For example, the detection electrodes Rx are provided above an external surface of the liquid crystal display panel PNL on the side of a screen on which an image is displayed. The detection electrodes Rx may be in contact with or remote from the external surface. In the latter case, a member such as an insulating film is provided between the external surface and the detection electrodes Rx. In the present embodiment, the detection electrodes Rx are in contact with the external surface. The external surface is a surface of the second substrate SUB2 opposite to a surface opposed to the first substrate SUB1, and includes a display surface on which an image is displayed. In the example illustrated, the detection electrodes Rx extend substantially in a first direction X and are aligned in a second direction Y crossing the first direction X. The detection electrodes Rx may be formed in an island shape and arrayed in a matrix in the first direction X and the second direction Y. The first direction X and the second direction Y are perpendicular to each other in the present embodiment, but may cross each other at an angle other than 90°. A third direction Z is substantially perpendicular to each of the first direction X and the second direction Y.

The drive IC chip IC1 serving as a first drive module is mounted on the first substrate SUB1 of the liquid crystal display panel PNL. The flexible printed circuit board FPC1 connects the liquid crystal display panel PNL and the control module CM. The flexible printed circuit board FPC2 connects the detection electrodes Rx of the sensor SE and the control module CM. The touch detection IC chip IC2 serving as a second drive module is mounted on the flexible printed circuit board FPC2. The flexible printed circuit board FPC3 connects the backlight unit BL and the control module CM. The control module CM can be restated as an application processor.

The drive IC chip IC1 and the touch detection IC chip IC2 are coupled via the flexible printed circuit board FPC2, etc. For example, if the flexible printed circuit board FPC2 comprises a branch portion FPCB connected to the first substrate SUB1, the drive IC chip IC1 and the touch detection IC chip 102 may be connected via the branch portion FPCB and a line on the first substrate SUB1. Alternatively, the drive IC chip IC1 and the touch detection IC chip 102 may be coupled via the flexible printed circuit boards FPC1 and FPC2.

The touch detection IC chip 102 can supply a timing signal to report a drive period of the sensor SE to the drive IC chip IC1. Otherwise, the drive IC chip IC1 can supply a timing signal to report a drive period of a common electrode CE to be explained later to the touch detection IC chip IC2. Otherwise, the control module CM can supply a timing signal to the IC chips IC1 and IC2. Drive of the drive IC chip IC1 can be synchronized with drive of the touch detection IC chip IC2 by the timing signal.

FIG. 2 is an illustration showing a basic structure and an equivalent circuit of the liquid crystal display device DSP shown in FIG. 1.

As shown in FIG. 2, the liquid crystal display device DSP comprises the drive IC chip IC1, a gate line drive circuit GD, etc., located in a non-display area NDA outside the display area DA, besides the liquid crystal display panel PNL, etc. The gate line drive circuit GD constitutes the first drive module together with the drive IC chip IC1. In the present embodiment, the drive IC chip IC1 comprises a source line drive circuit SD and a common electrode drive circuit CD. The drive IC chip IC1 may comprise at least a part of the source line drive circuit SD and the common electrode drive circuit CD. Besides, a multiplexer MU is formed in the non-display area NDA of the first substrate SUB1. The multiplexer MU is connected to the source line drive circuit SD. The non-display area NDA has a frame shape (rectangular frame shape) surrounding the display area DR.

The liquid crystal display panel PNL comprises a plurality of pixels PX in the display area DA. The pixels PX are arrayed in a matrix in the first direction X and the second direction Y. The liquid crystal display panel PNL also comprises a plurality of gate lines G, a plurality of source lines S, a common electrode CE, etc., in the display area DA.

The gate lines G extend substantially linearly in the first direction X, are led out to the outside of the display area DA, and are connected to the gate line drive circuit GD. The gate lines G are spaced apart in the second direction Y. The source lines S extend substantially linearly in the second direction Y, are led out to the outside of the display area DA, and are connected to the multiplexer MU. The source lines S are spaced apart in the first direction X, and cross the gate lines G. The gate lines G and the source lines S do not necessarily extend linearly, and may be partially bent. The common electrode CE is provided in the display area DA and electrically connected to the common electrode drive circuit CD. The common electrode CE is shared by the pixels PX. The common electrode CE will be described later in detail.

FIG. 3 is an equivalent circuit diagram showing one of the pixels PX shown in FIG. 2.

As shown in FIG. 3, each pixel PX comprises a pixel switching element PSW, a pixel electrode PE, the common electrode CE, a liquid crystal layer LC, etc. The pixel switching element PSW is formed of, for example, a thin-film transistor. The pixel switching element PSW is electrically connected to the gate line G and the source line S. The pixel switching element PSW may be in a top-gate type or a bottom-gate type. A semiconductor layer of the pixel switching element PSW is formed of, for example, polysilicon, but may be formed of amorphous silicon or an oxide semiconductor. The pixel electrode PE is electrically connected to the pixel switching element PSW. The pixel electrode PE is opposed to the common electrode CE. The common electrode CE, an insulating film and the pixel electrode PE form a storage capacitor CS.

In the specification, the expression "a first member on a second member" means that the first member may be in contact with the second member, at a distance from the second member or across a third member from the second member.

FIG. 4 is a cross-sectional view partially showing a structure of the liquid crystal display device DSP.

As shown in FIG. 4, the liquid crystal display device DSP comprises a first optical element OD1, a second optical element OD2, etc., besides the liquid crystal display panel PNL and the backlight unit BL. Both the pixel electrodes PE and the common electrode CE are provided on the first substrate SUB1. The liquid crystal display panel PNL has a structure corresponding to a fringe field switching (FFS) mode as a display mode. The FFS mode is a mode mainly using a lateral electric field approximately parallel to a main substrate surface. The main substrate surface is a surface parallel to an X-Y plane defined by the first direction X and the second direction Y.

The liquid crystal display panel PNL comprises the first substrate SUB1, the second substrate SUB2 and the liquid crystal layer LC. The first substrate SUB1 and the second substrate SUB2 are bonded to each other with a predetermined gap between. The liquid crystal layer LC is held between the first substrate SUB1 and the second substrate SUB2.

The first substrate SUB1 is formed by using a first insulating substrate 10 having a light transmitting property such as a glass substrate or a resin substrate. The first substrate SUB1 comprises the source lines S, the common electrode CE, the pixel electrodes PE, a first insulating film 11, a second insulating film 12, a third insulating film 13, a first alignment film AL1, etc., on a side of the first insulating substrate 10, which is opposed to the second substrate SUB2.

The first insulating film 11 is formed on the first insulating substrate 10. In the present embodiment, for example, pixel switching elements of a top gate structure are applied, which is not described in detail. In such an embodiment, the first insulating film 11 includes a plurality of insulating layers laminated in the third direction Z. For example, the first insulating film 11 includes various insulating layers such as an undercoat layer formed between the first insulating substrate 10 and the semiconductor layer of the pixel switching elements, a gate insulating layer formed between the semiconductor layer and gate electrodes, and an interlayer insulating layer formed between the gate electrodes and a plurality of electrodes including source electrodes and drain electrodes. The gate lines are disposed between the gate insulating layer and the interlayer insulating layer, similarly to the gate electrodes. The source lines S are formed on the first insulating film 11. The source electrodes, the drain electrodes, etc., of the pixel switching elements are also formed on the first insulating film 11. In the example illustrated, the source lines S extend in the second direction Y.

The second insulating film 12 is disposed on the source lines S and the first insulating film 11. The common electrode CE is formed on the second insulating film 12. The common electrode CE is formed of a transparent conductive material such as indium tin oxide (ITO) or indium zinc oxide (IZO). The common electrode CE comprises a plurality of divisional electrodes CA. The divisional electrodes CA are spaced apart in the first direction X. In the present embodiment, slits between the divisional electrodes CA are located directly above the source lines S and extend along the source lines S. This is to reduce deterioration of an aperture ratio of the pixels. A detailed structure of the common electrode CE will be described later. The source lines S include a source line S located between the divisional electrodes CA in the first direction X and a source line S opposed to the divisional electrode CA in the third direction Z. A metal layer ML is formed on the divisional electrodes CA to decrease the resistance of the divisional electrodes CA in the example illustrated, but the metal layer ML may be omitted.

The third insulation film 13 is disposed on the common electrode CE and the second insulating film 12. The pixel electrodes PE are formed on the third insulating film 13. In a plan view, each pixel electrode PE is located between adjacent source lines S and opposed to the common electrode CE. Each pixel electrode PE comprises a slit SL at a position opposed the common electrode CE. Such pixel electrodes PE are formed of a transparent conductive material such as ITO or IZO as the conductive material. The first alignment film AL1 covers the pixel electrodes PE and the third insulating film 13.

The second substrate SUB2 is formed by using a second insulating substrate 20 having a light transmitting property such as a glass substrate or a resin substrate. The second substrate SUB2 comprises a black matrix BM, color filters CFR, CFG and CFB, an overcoat layer CC, a second alignment film AL2, etc., on a side of the second insulating substrate 20, which is opposed to the first substrate SUB1.

The black matrix BM is formed on an inner surface of the second insulating substrate 20 and partitions the respective pixels. The color filters CFR, CFG and CFB are formed on the inner surface of the second insulating substrate 20 and partially overlap the black matrix BM. The color filters CFR are red filters arranged in red pixels and are formed of a red resin material. The color filters CFG are green filters arranged in green pixels and are formed of a green resin material. The color filters CFB are blue filters arranged in blue pixels and are formed of a blue resin material.

In the example illustrated, a unit pixel which is a minimum unit constituting a color image is constituted by three color pixels, i.e., the red pixel, the green pixel and the blue pixel. However, the unit pixel is not limited to a combination of the three color pixels. For example, the unit pixel may be constituted by four color pixels, i.e., the red pixel, the green pixel, the blue pixel and a white pixel. In this case, a white filter, a transparent filter or a light-colored filter may be arranged in the white pixel or the filter of the white pixel may be omitted. The overcoat layer OC covers the color filters CFR, CFG and CFB. The overcoat layer OC is formed of a transparent resin material. The second alignment film AL2 covers the overcoat layer OC.

The second optical element OD2 is bonded to the liquid crystal display panel PNL by an adhesive layer AD. The detection electrodes Rx are located between the second insulating substrate 20 and the adhesive layer AD. The detection electrodes Rx are formed above a surface (external surface ES) of the second insulating substrate 20. A detailed structure of the detection electrodes Rx will be described later. In addition, the illustration is simplified and lead lines L to be described later are not shown. The detection electrodes Rx are opposed to the common electrode CE via dielectric members such as the third insulating film 13, the first alignment film AL1, the liquid crystal layer LC, the second alignment film AL2, the overcoat layer OC, the color filters CFR, CFG and CFB and the second insulating substrate 20.

In the present embodiment, the detection electrodes Rx comprise a transparent conductive layer TC formed of, for example, ITO, as the conductive material. The detection electrodes Rx may comprise a transparent conductive layer formed of the other transparent conductive material such as IZO or zinc oxide (ZnO). The detection electrodes Rx may be formed of a combination (aggregate) of the transparent conductive layer (TC) and metal lines (or a metal layer). This is because the time required for detection can be shortened by reducing the resistance value of the detection electrodes Rx. Use of the metal lines or the metal layer for the detection electrodes Rx may be beneficial for upsizing and definition improvement of the liquid crystal display panel PNL.

The first optical element OD1 is disposed between the first insulating substrate 10 and the backlight unit BL. The second optical element OD2 is disposed above the detection electrodes Rx. Each of the first optical element OD1 and the second optical element OD2 includes at least a polarizer and may include a retardation film as needed. An absorption axis of the polarizer included in the first optical element OD1 is substantially orthogonal to an absorption axis of the polarizer included in the second optical element OD2. The liquid crystal display device DSP can detect data on a position on an input surface IS that a finger or the like has touched or approached. In the present embodiment, the input surface IS of the liquid crystal display device DSP is a surface of the second optical element OD2.

However, the input surface IS is not limited to the surface of the second optical element OD2 and can be variously modified. For example, when a third insulating substrate different from the first insulating substrate 10 or the second insulating substrate 20 is located on the surface of the liquid crystal display device DSP, the input surface IS is a surface of the third insulating substrate. The third insulating substrate is a substrate having a light transmitting property such as a glass substrate or a resin substrate. If the third insulating substrate is a glass substrate, the third insulating substrate can function as a cover glass.

Next, the capacitive sensor SE included in the liquid crystal display device DSP of the present embodiment will be explained. FIG. 5 is a plan view showing a structure of the sensor SE of the present embodiment. The drive IC chip IC1 is not shown in FIG. 5 but the common electrode drive circuit CD is provided on the drive IC chip IC1 as described above.

As shown in FIG. 5, the sensor SE of the present embodiment comprises the detection electrodes Rx and the lead lines L on the second substrate SUB2 side and uses the common electrode CE on the first substrate SUB1 side. In other words, the common electrode CE functions as an electrode for display and also functions as a sensor drive electrode.

The common electrode CE and the detection electrodes Rx are disposed in the display area DA. In the example illustrated, the common electrode CE comprises the divisional electrodes CA formed in the shape of strips, spaced apart in the first direction X and extending substantially linearly in the second direction Y, in the display area DA.

The non-display area NDA includes a first area A1 (strip-shaped area extending in the second direction Y) on the right side of the second substrate SUB2, a second area A2 (strip-shaped area extending in the second direction Y) on the left side of the second substrate SUB2, a third area A3 (strip-shaped area extending in the first direction X) on the lower side of the second substrate SUB2 and a fourth area A4 (strip-shaped area extending in the first direction X) on the upper side of the second substrate SUB2. In the present embodiment, the display area DA has a rectangular shape.

In the display area DA, the detection electrodes Rx are spaced apart in the second direction Y and extend substantially linearly in the first direction X. In other words, the detection electrodes Rx extend in the direction crossing the divisional electrodes CA. The common electrode CE (divisional electrodes CA extending in the second direction Y) and the detection electrodes Rx extending in the first direction X are opposed to each other with the various dielectric members between as described above. The number, size and shape of the divisional electrodes CA are not particularly limited and can be variously changed.

The lead lines L are disposed above the external surface ES of the liquid crystal display panel PNL in the non-display area NDA. The lead lines L are electrically connected to the detection electrodes Rx, respectively. Each lead line L outputs a sensor output value from the detection electrode Rx. In the example illustrated, the lead lines L are disposed in the first area A1 or the second area A2, and the third area A3 of the second substrate SUB2. For example, of the lead lines L, lead lines L connected to odd-numbered detection electrodes Rx are disposed in the second area A2 and the third area A3, and lead lines L connected to even-numbered detection electrodes Rx are disposed in the first area A1 and the third area A3. This layout of the lead lines L is designed in consideration of the uniformity in width of the first area A1 and the second area A2 in the first direction X and a thin bezel of the liquid crystal display device DSP.

The liquid crystal display device DSP further comprises the common electrode drive circuit (first drive circuit) CD disposed in the non-display area NDA. Each divisional electrode CA is electrically connected to the common electrode drive circuit CD. The common electrode drive circuit CD provides a common drive signal to the common electrode CE at the display drive for displaying an image, and provides a sensor drive signal to the common electrode CE at the sense drive for sensing.

The flexible printed circuit board FPC2 is connected to an outer lead bonding (OLB) pad group disposed above the external surface ES of the liquid crystal display panel PNL in the non-display area NDA. Pads of the OLB pad group are electrically connected to the detection electrodes Rx via the lead lines L, respectively. In the present embodiment, the lead lines L are formed of metal as a conductive material. The width of the lead lines L can be reduced by forming the lead lines L of a metal material having a much lower resistance value than a transparent conductive material. Since the OLB pad group can be concentrated at one position in the third area A3 of the second substrate SUB2, size and cost reduction of the flexible printed circuit board FPC2 can be realized.

A detection circuit RC is built in, for example, the touch detection IC chip IC2. The detection circuit RC detects a touch or approach of a conductor to the input surface IS of the liquid crystal display device DSP based on the sensor output values from the detection electrodes Rx. The detection circuit RC can also detect data on a position that the conductor has touched or approached. The detection circuit RC may be included in the control module CM.

Figure 6:
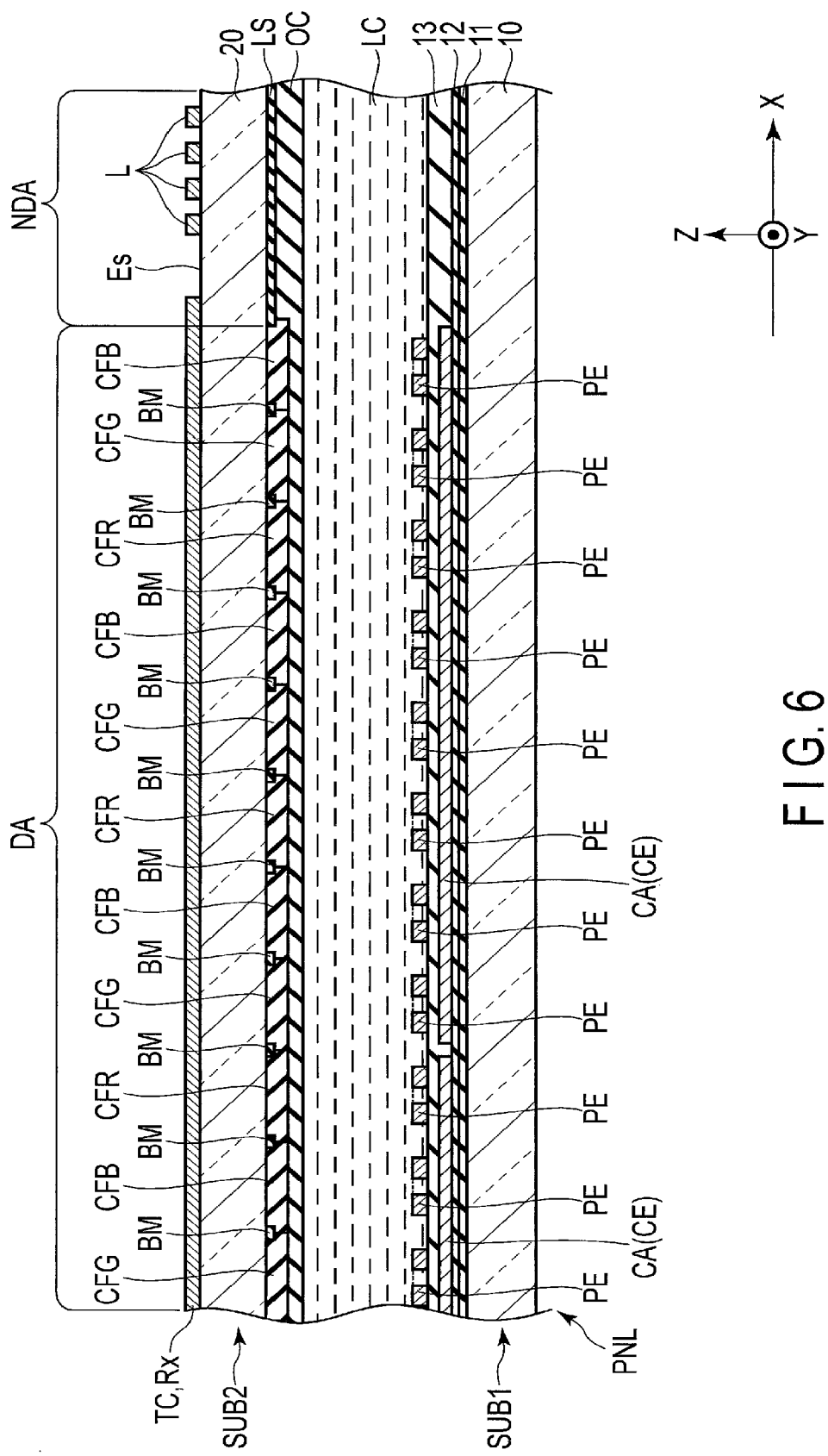
FIG. 6 is a cross-sectional view showing a structure of the liquid crystal display panel including a part of the sensor.

FIG. 6 is a cross-sectional view showing a structure of the liquid crystal display panel PNL including a part of the sensor SE. FIG. 6 shows main parts alone necessary for explanations.

As shown in FIG. 6, the common electrode CE and the pixel electrodes PE are located on the side of the inner surface of the first substrate SUB1 which is opposed to the second substrate SUB2. The common electrode CE is formed on the second insulating film 12 and covered with the third insulating film 13. The pixel electrodes PE are formed on the third insulating film 13 and opposed to the common electrode CE. In the example illustrated, the pixel electrodes PE for eight pixels are disposed directly above each divisional electrode CA, but the number of the pixel electrodes PE located directly above each divisional electrode CA is not limited to this. The first alignment film and various lines such as the source lines are not shown.

The black matrix BM, the color filters CFR, CFG and CFB, the overcoat layer OC and a peripheral light-shield layer LS are located on the side of the inner surface of the second substrate SUB2 which is opposed to the first substrate SUB1. The color filters CFR, CFG and CFB are formed at positions opposed to the pixel electrodes PE, respectively, in the display area DA. The black matrix BM is located at each boundary between the color filters CFR, CFG and CFB. The peripheral light-shield layer LS is disposed in the non-display area NDA and formed on the inner surface of the second insulating film 20. The peripheral light-shield layer LS is formed in a frame shape (rectangular frame shape). The peripheral light-shield layer LS is formed of the same material as the black matrix BM. The overcoat layer OC extends over the display area DA and the non-display area NDA. The second alignment film is not shown. The lead lines L are disposed at positions overlapping the peripheral light-shield layer LS.

The detection electrodes Rx and the lead lines L are located on the side of the surface (external surface ES) of the second substrate SUB2 opposite to the surface opposed to the first substrate SUB1. The lead lines L are formed of a metal material such as aluminum (Al), titanium (Ti), silver (Ag), molybdenum (Mo), tungsten (W), copper (Cu) or chromium (Cr). The detection electrodes Rx located in the display area DA are formed of strip electrodes using ITO.

Next, operation executed at the display drive for displaying an image in the FFS mode liquid crystal display device DSP is explained.

First, an off-state in which no voltage is applied to the liquid crystal layer LC is explained. The off-state corresponds to a state in which a potential difference is not applied between the pixel electrodes PE and the common electrode CE. In such an off-state, liquid crystal molecules included in the liquid crystal layer LC are subjected to initial alignment unidirectionally in the X-Y plane by an alignment restriction force of the first alignment film AL1 and the second alignment film AL2. Part of backlight from the backlight unit BL passes through the polarizer of the first optical element OD1 and is made incident on the liquid crystal display panel PNL. The light incident on the liquid crystal display panel PNL is linearly polarized light orthogonal to the absorption axis of the polarizer. Such a polarized state of the linearly polarized light hardly varies when the light passes through the liquid crystal display panel PNL in the off-state. For this reason, most part of the linearly polarized light passing through the liquid crystal display panel PNL is absorbed by the polarizer of the second optical element OD2 (black display). A mode in which the liquid crystal display panel PNL becomes a black display in the off-state is called a normally-black mode.

Next, an on-state in which a voltage is applied to the liquid crystal layer LC is explained. The on-state corresponds to a state in which a potential difference is applied between the pixel electrodes PE and the common electrode CE. In other words, the common drive signal (common voltage) is supplied from the common electrode drive circuit CD to the common electrode CE. An image signal (for example, a video signal) to produce a potential difference relative to the common voltage is supplied to the pixel electrodes PE. A fringe field is thereby produced between the pixel electrodes PE and the common electrode CE in the on-state.

In such an on-state, the liquid crystal molecules are aligned in a direction different from the initial alignment direction in the X-Y plane. In the on-state, linearly polarized light orthogonal to the absorption axis of the polarizer of the first optical element OD1 is made incident on the liquid crystal display panel PNL, and the polarized state of the light varies according to the alignment state of the liquid crystal molecules when the light passes through the liquid crystal layer LC. For this reason, in the on-state, at least part of the light passing through the liquid crystal layer LC passes through the polarizer of the second optical element OD2 (white display).

Next, operation executed at the sense drive for sensing to detect a touch or approach of the conductor to the input surface IS of the liquid crystal display device DSP is explained. The sensor drive signal is provided from the common electrode drive circuit CD to the common electrode CE. The sensor SE receives a sensor signal from the common electrode CE in this state and sensing is thereby executed.

A principle of an example of a sense method is hereinafter explained with reference to FIG. 7.

As shown in FIG. 7, the detection electrodes Rx are disposed in at least the display area DA. A capacitance Cc is present between the divisional electrodes CA and the detection electrodes Rx. In other words, the detection electrodes Rx are capacitively coupled with the divisional electrodes CA (common electrode CE). A pulse-like write signal (sensor drive signal) Vw is sequentially supplied to the respective divisional electrodes CA in a predetermined cycle. In this example, it is assumed that the user's finger is close to a position where a specific detection electrode Rx and a specific divisional electrode CA cross each other. A capacitance Cx occurs due to the user's finger close to the detection electrode Rx. When the pulse-like write signal Vw is supplied to the divisional electrodes CA, a pulse-like read signal (sensor output value) Vr of a level lower than the levels of pulses obtained from the other detection electrodes is obtained from the specific detection electrode Rx. In other words, when input position data which is position data of the user's finger in the display area DA is detected, the drive IC chip IC1 (common electrode drive circuit CD) serving as the first drive module supplies the write signal Vw to the common electrode CE (divisional electrodes CA) and generates a sensor signal between the common electrode CE and the sensor SE. The touch detection IC chip IC2 serving as the second drive module is connected to the sensor SE and reads the read signal Vr indicating a variation in the sensor signal (for example, capacitance occurring in the detection electrode Rx).

The detection circuit RC shown in FIG. 5 can detect two-dimensional position data of the finger in the X-Y plane of the sensor SE, based on the timing of supplying the write signal Vw to the divisional electrodes CA and the read signal Vr from each detection electrode Rx. The capacitance Cx varies depending on whether the finger is close to or far from the detection electrodes Rx. Accordingly, the level of the read signal Vr also varies depending on whether the finger is close to or far from the detection electrodes Rx. Therefore, the detection circuit RC can also detect the proximity of the finger to the sensor SE (i.e., a distance in a normal direction of the sensor SE) based on the level of the read signal Vr.

FIG. 8 is an enlarged plan view partially showing the non-display area NDA of the first substrate SUB1 and including a circuit diagram partially showing the multiplexer MU. As shown in FIG. 8, the multiplexer MU comprises a plurality of control switching element groups CSWG. Each control switching element group CSWG comprises a plurality of control switching elements CSW. In the present embodiment, each control switching element group CSWG comprises three control switching elements CSW. In the present embodiment, the multiplexer MU is a ⅓ multiplexer.

The multiplexer MU is connected to the source lines S. The multiplexer MU is also connected to the source line drive circuit SD through connection lines W. The connection lines W are lines for outputting an image signal from the source line drive circuit SD to the multiplexer MU. In the present embodiment, the number of the connection lines W is one third of the number of the source lines S.

The control switching elements CSW are sequentially turned on by control signals SELR, SELG and SELB for time-division drive of three source lines S for each output (connection line W) of the source line drive circuit SD. In other words, the control switching elements CSW are switched between a conductive state (on) and a non-conductive state (off) by the control signals SELR, SELG and SELB. The control signals SELR, SELG and SELB are supplied from the drive IC chip IC1 to the control switching elements CSW through control lines (not shown), respectively.

Signals are allowed to be transmitted from the source line drive circuit SD to the source lines S by turning on the control switching elements CSW. The signals include not only the image signal but also a first pre-charge signal and a second pre-charge signal to be described later. The drive IC chip IC1 can simultaneously output the control signals SELR, SELG and SELB for turning off the control switching elements CSW (i.e., bringing the control switching elements CSW into the non-conductive state) and switch all the source lines S to an electrically floating state under the control of the control module CM. For example, the source lines S can thereby have high impedance (Hi-Z).

It should be noted that the liquid crystal display panel PNL can use various well-known multiplexers (selector circuits) instead of the multiplexer MU. For example, the liquid crystal display panel PNL can use a ½ multiplexer.

Alternatively, the liquid crystal display panel PNL may be formed without a multiplexer (for example, the multiplexer MU). In this case, each source line S may be connected to the source line drive circuit SD through the other control switching element. All the source lines S can be switched to the electrically floating state by turning off all the other control switching elements.

Next, a liquid crystal display device and a method of driving the same of an example of the present embodiment and those of a comparative example of the present embodiment are described. The comparative example is an example to be compared to the example.

EXAMPLE

First, the liquid crystal display device and the method of driving the same of the example are described.

FIG. 9 is an illustration partially showing the pixels PX, colors expressed by the pixels PX and polarities of the pixels PX (pixel electrodes) in an arbitrary $F^{th}$ frame period (F-frame period) in the example. FIG. 10 is an illustration partially showing the pixels PX, colors expressed by the pixels PX and polarities of the pixels PX (pixel electrodes) in an arbitrary $F+1^{th}$ frame period (F+1 frame period) in the example.

As shown in FIG. 9 and FIG. 10, the drive method of the liquid crystal display device is a column-inversion drive method. For this reason, the polarity of an image signal supplied to pixel electrodes of pixels PX in odd-numbered columns in one frame period is different from the polarity of an image signal supplied to pixel electrodes of pixels PX in even-numbered columns in one frame period. The polarity of the image signal supplied to each pixel electrode is inverted in each frame period.

The pixels PX are classified into a plurality of groups. In the example illustrated in FIG. 9 and FIG. 10, the groups are m groups from a group of a first target E1 to a group of an $m^{th}$ target Em. In the example, m is a natural number not less than three. However, m is not limited to the example as long as m is a natural number not less than two.

In both the F-frame period and the F+1 frame period, the polarity of pixel electrodes of pixels PX of the first target E1 (odd-numbered target E) is inverted in each column and the polarity of pixel electrodes of pixels PX of the second target E2 (even-numbered target E) is also inverted in each column. Therefore, blocks whose polarity is inverted in each column and blocks whose polarity is inverted in units of columns are not alternately generated. As a result, non-uniformity in display in a block unit can be prevented from being visually identified.

One frame period includes m display periods and m sense periods. The display periods and the sense periods are alternately provided. Therefore, one frame period includes a first display period during which pixels PX of a plurality of rows of the first target E1 are driven, a first sense period following the first display period, a second display period following the first sense period during which pixels PX of a plurality of rows of the second target E2 are driven, a second sense period following the second display period, etc., and further includes an $m^{th}$ (last) display period during which pixels PX of a plurality of rows of the $m^{th}$ target Em are driven and an $m^{th}$ sense period following the $m^{th}$ display period.

Pixels PX of each target E are pixels of N rows. In the example, N is four. However, N is not limited to four and can be variously changed. N should preferably be a natural number not less than three and not more than one hundred in consideration of power consumption and display quality, depending on the size and resolution of the screen. More specifically, N should preferably be a natural number not less than three and not more than twenty.

It should be noted that the power consumption and the display quality are in a trade-off relationship.

As N becomes smaller, higher display quality can be obtained. This is because a period during which an unnecessary electric field is leaked from the source lines to the liquid crystal layer is reduced, an alignment failure of the liquid crystal molecules is prevented and a display failure such as vertical crosstalk can be avoided, which will be described later. In the example, vertical crosstalk means a streaky non-uniformity in luminance along the source lines.

In contrast, as N becomes larger, lower power consumption can be achieved. This is because the number of inversions of the polarity of a signal supplied to the source lines can be reduced as N becomes larger, which will be described later.

In the example, pixels PX of each target E are pixels PX of consecutive N rows. For example, the pixels PX of the first target E1 are pixels PX from the first to fourth rows, and the pixels PX of the second target E2 are pixels PX from the fifth to eighth rows. However, pixels PX of each target E are not limited to the example and may be pixels PX of inconsecutive N rows. In this case, for example, the pixels PX of the first target E1 are pixels PX of the first, third, fifth and seventh rows, and the pixels PX of the second target E2 are pixels PX of the second, fourth, sixth and eighth rows.

FIG. 11 is a circuit diagram showing pixels PX of an arbitrary $j^{th}$ target Ej and a $j+1^{th}$ target Ej+1 in arbitrary six columns in the example, and showing eight gate lines G, six source line S, a plurality of pixel switching elements PSW, a plurality of pixel electrodes PE and two divisional electrodes CA. It is assumed that j is a natural number not less than one and j+1 is a natural number not more than m. For example, j=1.

As shown in FIG. 11, source lines S(k+1) and S(k+2) are opposed to a divisional electrode (first divisional electrode) CA(h), and source lines S(k−3), S(k−2) and S(k−1) are opposed to a divisional electrode (second divisional electrode) CA(h−1). A source line S(k) is located in a slit between the divisional electrodes CA(h) and CA(h−1). N gate lines Gj(N−3), Gj(N−2), Gj(N−1) and Gj(N) of the $j^{th}$ target Ej and N gate lines Gj+1(N−3), Gj+1(N−2), Gj+1(N−1) and Gj+1(N) of the j+1$^{th}$ target Ej+1 cross the source lines S(k−3) to S(k+2).

Of the illustrated pixel switching elements PSW, N pixel switching elements (first pixel switching elements) PSW of the $j^{th}$ target Ej in the $k^{th}$ column are electrically connected to the source line (first source line) S(k), and are electrically connected to the gate lines Gj(N−3) to Gj(N) of the $j^{th}$ target Ej, respectively. N pixel switching elements (first pixel switching elements) PSW of the j+1$^{th}$ target Ej+1 in the $k^{th}$ column are electrically connected to the source line S(k), and are electrically connected to the gate lines Gj+1(N−3) to Gj+1(N) of the j+1$^{th}$ target Ej+1, respectively.

N pixel switching elements (second pixel switching elements) PSW of the $j^{th}$ target Ej in the k−1$^{th}$ column are electrically connected to the source line (second source line) S(k−1), and are electrically connected to the gate lines Gj(N−3) to Gj(N) of the $j^{th}$ target Ej, respectively. N pixel switching elements (second pixel switching elements) PSW of the j+1$^{th}$ target Ej+1 in the k−1$^{th}$ column are electrically connected to the source line S(k−1), and are electrically connected to the gate lines Gj+1(N−3) to Gj+1(N) of the j+1$^{th}$ target Ej+1, respectively.

Of the illustrated pixel electrodes PE, N pixel electrodes (first pixel electrodes) PE of the $j^{th}$ target Ej in the $k^{th}$ column are electrically connected to the pixel switching elements (first pixel switching elements) PSW of the $j^{th}$ target Ej, respectively. N pixel electrodes (first pixel electrodes) PE of the j+1$^{th}$ target Ej+1 in the $k^{th}$ column are electrically connected to the pixel switching elements (first pixel switching elements) PSW of the j+1$^{th}$ target Ej+1, respectively.

N pixel electrodes (second pixel electrodes) PE of the $j^{th}$ target Ej in the k−1$^{th}$ column are electrically connected to the pixel switching elements (second pixel switching elements) PSW of the $j^{th}$ target Ej, respectively. N pixel electrodes (second pixel electrodes) PE of the j+1$^{th}$ target Ej+1 in the k−1$^{th}$ column are electrically connected to the pixel switching elements (second pixel switching elements) PSW of the j+1$^{th}$ target Ej+1, respectively.

A malfunction which may occur in the pixels PX in the k−1$^{th}$ column in the case of supplying a negative polarity image signal Isig(k−1) to the source line S(k−1) and supplying a positive polarity image signal Isig(k) to the source line S(k) when using the column inversion drive method is hereinafter described.

Figure 12:
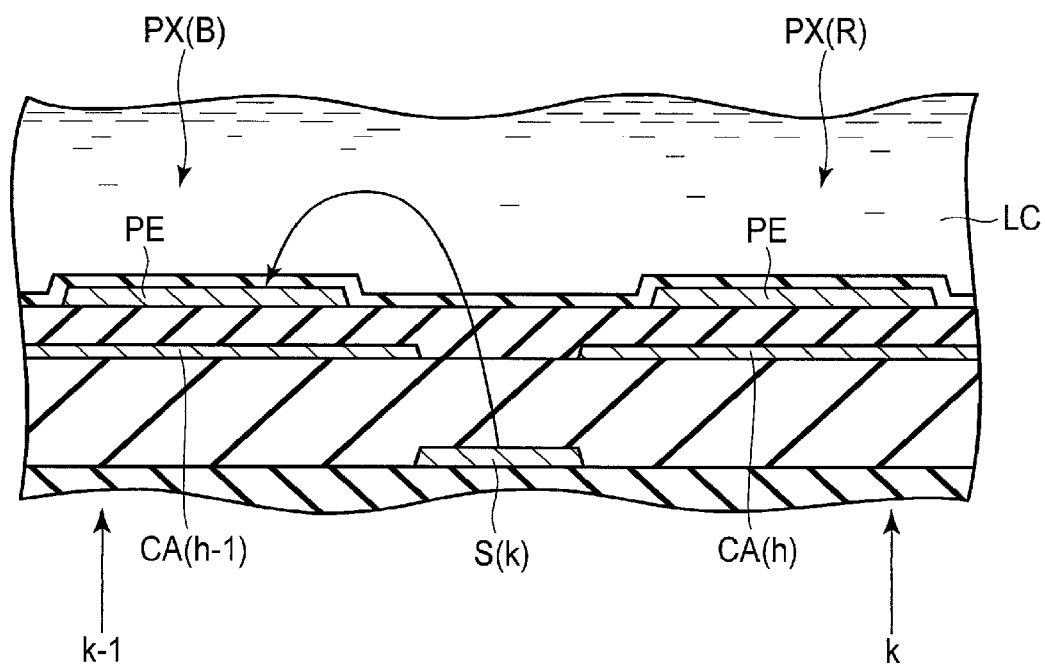
FIG. 12 is a cross-sectional view partially showing the liquid crystal display panel seen along line XII-XII of FIG. 11.

As shown in FIG. 12, the source line S(k) is not electrically shielded by the divisional electrodes CA. Pixel electrodes PE of red pixels PX in the $k^{th}$ column and the source line S(k) have a positive polarity but pixel electrodes PE of blue pixels PX in the k−1$^{th}$ column have a negative polarity. As a result, an electric field is unnecessarily leaked from the source line S(k) into an area of the liquid crystal layer LC opposed to the pixel electrodes PE of the pixels PX in the k−1$^{th}$ column and an alignment failure of the liquid crystal molecules occurs.

Therefore, the liquid crystal display device is driven so as to prevent the alignment failure of the liquid crystal molecules in the present embodiment.

Next, a method of driving the liquid crystal display device of the example is described.

In the example, a first pre-charge period is generally provided following a display period and preceding a sense period. The source lines S are driven during the first pre-charge period and the source line S located in the slit between the divisional electrodes CA is driven with a different polarity from the preceding display period. With reference to FIG. 11, a positive polarity image signal Isig(k) is supplied to the source line S(k) and a negative polarity image signal Isig(k−1) is supplied to the source line S(k−1) in a display period for the $j^{th}$ target Ej, and a negative polarity first pre-charge signal Vp1(k) is supplied to the source line S(k) and a negative polarity first pre-charge signal Vp1(k−1) is supplied to the source line S(k−1) in the following first pre-charge period.

In this manner, a potential difference between the source line S(k) and the pixel electrodes PE of the $j^{th}$ target Ej in the k−1$^{th}$ column adjacent to the source line S(k) can be reduced in the first pre-charge period and the following sense period, and a leak of an unnecessary electric field from the source line S(k) to liquid crystal of the pixels PX of the $j^{th}$ target Ej in the k−1$^{th}$ column can be thereby inhibited.

The inhibiting effect on the leak of electric field can be obtained by executing the above-described polarity inversion drive only for the source line S located in the slit between the divisional electrodes CA. However, the above-described polarity inversion drive may be executed for source lines S not located in the slit. In the example, the above-described polarity inversion drive is executed for all the source line S connected to pixels PX for red display (source line S(k−3), source line S(k), etc.). In this case, the slit of the common electrode may be opposed to any of the source lines S connected to the pixels PX for red display.

In the example, the pixels PX in the k−1$^{th}$ column adjacent to the source line S(k) and the slit display blue, but are not limited to this and may be variously changed. The pixels PX in the k−1$^{th}$ column may be configured to display red, green or white as long as the pixels PX other than the pixels PX in the k−1$^{th}$ column are adjusted to display predetermined colors. However, the pixels PX in the k−1$^{th}$ column should preferably be configured to display blue because the occurrence of a display failure such as the vertical crosstalk is less likely to be visually identified in comparison with the case where the pixels PX in the k−1$^{th}$ column are configured to display red or green.

The pixels PX connected to the source line S located in the slit between the adjacent divisional electrodes CA may be configured to display a color different from red as long as the polarity of the image signal Isig(k) supplied to the source line S(k) in a display period is opposite to the polarity of the first pre-charge signal Vp1(k) supplied to the source line S(k) in a first pre-charge period following the display period.

FIG. 13 is a timing chart showing the method of driving the liquid crystal display device of the example and showing various control signals SG and SEL, image signals Isig, first pre-charge signals Vp1, second pre-charge signals Vp2, a common drive signal Vcom, a write signal Vw and a read signal Vr in a part of the F-frame period.

The F-frame period includes m display periods Pd, m first pre-charge periods Ppr1, m sense periods Ps and m second pre-charge periods Ppr2. Therefore, the first drive module (drive IC chip IC1 and gate line drive circuit GD) and the second drive module (touch detection IC chip IC2) repeats display drive executed in a display period Pd, first pre-charge drive executed in a first pre-charge period Ppr1, sense drive executed in a sense period Ps and second pre-charge drive executed in a second pre-charge period Ppr2 for m times in the F-frame period.

FIG. 13 shows a part of a display period (first display period) Pdj for the $j^{th}$ target Ej, a first pre-charge period Ppr1 following the display period Pdj, a sense period Ps following the first pre-charge period Ppr1, a second pre-charge period Ppr2 following the sense period Ps and a part of a display period (second display period) Pdj+1 for the j+1$^{th}$ target Ej+1 following the second pre-charge period Ppr2 of the F-frame period. The part of the display period Pdj is a drive period Pdj(N) for pixels PX of the j$^{th}$ target Ej in the N$^{th}$ row. The part of the display period Pdj+1 is a drive period Pdj+1(N−3) for pixels PX of the j+1$^{th}$ target Ej+1 in the N−3$^{th}$ row. Therefore, a method of driving the liquid crystal display device from the drive period Pdj(N) to the drive period Pdj+1(N−3) is mainly described.

As shown in FIG. 13 and FIG. 11, the first pre-charge period Ppr1, the sense period Ps and the second pre-charge period Ppr2 are blanking periods during which drive of all the gate lines G is suspended. The sense period Ps is a blanking period during which drive of all the gate lines G and all the source lines S is suspended. In each sense period Ps, one or more divisional electrodes CA can be a target of sense drive.

First, in the display period Pdj, the gate line drive circuit GD sequentially supplies control signals SGj (N−3) to SGj (N) to gate lines Gj (N−3) to Gj (N) of the j$^{th}$ target Ej, the drive IC chip IC1 executes time-division drive of a plurality of source lines S including the source lines S(k−3) to S(k+2) by control signals SELR, SELG and SELB, the source line drive circuit SD outputs a plurality of image signals including image signals Isig(k−3) to Isig(k+2), the common electrode drive circuit CD supplies a common drive signal Vcom to a plurality of divisional electrodes CA including the divisional electrode CA(h) and the divisional electrode CA(h−1), and the liquid crystal display panel PNL is thereby driven.

In this manner, the pixel switching elements PSW of the j$^{th}$ target Ej are sequentially switched from the non-conductive state to the conductive state, and all the pixel switching elements PSW of the j+1$^{th}$ target Ej+1 (i.e., pixel switching elements PSW other than the j$^{th}$ target Ej) are maintained in the non-conductive state. Image signals Isig(k−2), Isig(k) and Isig(k+2) having the positive polarity are supplied to pixel electrodes PE of the j$^{th}$ target Ej in the k−2$^{th}$, k$^{th}$ and k+2$^{th}$ columns, and image signals Isig(k−3), Isig(k−1) and Isig(k+1) having the negative polarity are supplied to pixel electrodes PE of the j$^{th}$ target Ej in the k−3$^{th,}$ k−1$^{th}$ and k+1$^{th}$ columns. Image signals Isig having polarities corresponding to respective columns are also supplied to pixel electrodes PE of the j$^{th}$ target Ej in the other columns than the k−3$^{th}$ to k+2$^{th}$ columns through the source lines S, etc.

For example, in the last drive period Pdj(N) of the display period Pdj, an image signal (first image signal) Isig(k) having the positive polarity (first polarity) is supplied to a pixel electrode PE of a pixel PX of the j$^{th}$ target Ej in the Nth row and the k$^{th}$ column, and an image signal (second image signal) Isig(k−1) having the negative polarity (second polarity) is supplied to a pixel electrode PE of a pixel PX of the j$^{th}$ target Ej in the N$^{th}$ row and the k−1$^{th}$ column. In the same frame period, on the assumption that the polarity of the image signal Isig(k) is the first polarity, the polarity of the image signal Isig(k−1) is the second polarity. The first polarity and the second polarity are different from each other.

Next, in the display period Pdj+1 following the display period Pdj, the gate line drive circuit GD sequentially supplies control signals SGj+1(N−3) to SGj+1(N) to gate lines Gj+1(N−3) to Gj+1(N) of the j+1$^{th}$ target Ej+1, the drive IC chip IC1 executes time-division drive of a plurality of source lines S including the source lines S(k−3) to S(k+2) by the control signals SELR, SELG and SELB, the source line drive circuit SD outputs a plurality of image signals including the image signals Isig(k−3) to Isig(k+2), the common electrode drive circuit CD supplies the common drive signal Vcom to a plurality of divisional electrodes CA including the divisional electrode CA(h) and the divisional electrode CA(h−1), and the liquid crystal display panel PNL is thereby driven.

In this manner, the pixel switching elements PSW of the j+1$^{th}$ target Ej+1 are sequentially switched from the non-conductive state to the conductive state, and all the pixel switching elements PSW of the j$^{th}$ target Ej (i.e., pixel switching elements PSW other than the j+1$^{th}$ target Ej+1) are maintained in the non-conductive state. The image signals Isig(k−2), Isig(k) and Isig(k+2) having the positive polarity are supplied to pixel electrodes PE of the j+1$^{th}$ target Ej+1 in the k−2$^{th}$, k$^{th}$ and k+2$^{th}$ columns, and the image signals Isig(k−3), Isig(k−1) and Isig(k+1) having the negative polarity are supplied to pixel electrodes PE of the j+1$^{th}$ target Ej+1 in the k−3$^{th}$, k−1$^{th}$ and k+1$^{th}$ columns. Image signals Isig having polarities corresponding to respective columns are also supplied to pixel electrodes PE of the j+1$^{th}$ target Ej+1 in the other columns than the k−3$^{th}$ to k+2$^{th}$ columns through the source lines S, etc.

For example, in the first drive period Pdj+1(N−3) of the display period Pdj+1, the image signal (first image signal) Isig(k) having the positive polarity (first polarity) is supplied to a pixel electrode PE of a pixel PX of the j+1$^{th}$ target Ej+1 in the N−3$^{th}$ row and the k$^{th}$ column, and the image signal (second image signal) Isig(k−1) having the negative polarity (second polarity) is supplied to a pixel electrode PE of a pixel PX of the j+1$^{th}$ target Ej+1 in the N−3$^{th}$ row and the k−1$^{th}$ column.

In the sense period Ps, input of the control signals SG and the image signals Isig to the gate lines G and the source lines S is suspended. All the pixel switching elements PSW are thereby maintained in the non-conductive state. The drive IC chip IC1 maintains the control switching elements CSW in the non-conductive state by the control signals SELR, SELG and SELB, and makes all the source lines S have high impedance.

In the sense period Ps, the sensor SE is driven. When the sensor SE is driven, the common electrode drive circuit CD supplies a write signal (sensor drive signal) Vw to at least one of the divisional electrodes CA. For example, the common electrode drive circuit CD supplies the write signal Vw to at least one of the divisional electrode CA(h) and the divisional electrode CA(h−1) in the sense period Ps. In the example, the common electrode drive circuit CD sequentially supplies the write signal Vw to all the divisional electrodes CA in the sense period Ps. The write signal Vw is a pulse signal. For example, a low level potential of the write signal Vw is equal to a potential of the common drive signal Vcom.

The touch detection IC chip IC2 reads a read signal Vr from the detection electrodes Rx in the sense period Ps. Input position data is determined based on the read signal Vr.

The read signal Vr is a signal indicating a variation in a sensor signal generated between the detection electrodes Rx and at least one of the divisional electrodes CA. For example, the read signal Vr is a signal indicating a variation in a sensor signal generated between the detection electrodes Rx and at least one of the divisional electrode CA(h) and the divisional electrode CA(h−1).

In the first pre-charge period Ppr1, input of the control signals SG to the gate line G is suspended. All the pixel switching elements PSW are thereby maintained in the non-conductive state. The drive IC chip IC1 executes time-division drive of a plurality of source lines S including the source lines S(k−3) to S(k+2) by the control signals SELR, SELG and SELB, the source line drive circuit SD outputs a plurality of first pre-charge signals Vp1 including first pre-charge signals Vp1(k−3) to Vp1(k+2), the common electrode drive circuit CD supplies the common drive signal Vcom to a plurality of divisional electrodes CA including the divisional electrode CA(h) and the divisional electrode CA(h−1), and the liquid crystal display panel PNL is thereby driven.

First pre-charge signals Vp1(k−3), Vp1(k−2) and Vp1(k+2) having the positive polarity are supplied to the source lines S(k−3), S(k−2) and S(k+2), and first pre-charge signals Vp1(k−1), Vp1(k) and Vp1(k+1) having the negative polarity are supplied to the source lines S(k−1), S(k) and S(k+1). First pre-charge signals Vp1 having corresponding polarities are also supplied to the other source lines S than the source line S(k−3) to S(k+2).

When focusing attention on the image signals Isig(k−3) to Isig(k+2) and the first pre-charge signals Vp1(k−3) to Vp1(k+2), the polarity of the image signal Isig(k−2) is the same as the polarity of the first pre-charge signal Vp1(k−2), the polarity of the image signal Isig(k−1) is the same as the polarity of the first pre-charge signal Vp1(k−1), the polarity of the image signal Isig(k+1) is the same as the polarity of the first pre-charge signal Vp1(k+1), and the polarity of the image signal Isig(k+2) is the same as the polarity of the first pre-charge signal Vp1(k+2).

In contrast, the polarity of the image signal Isig(k−3) is different from the polarity of the first pre-charge signal Vp1(k−3), and the polarity of the image signal Isig(k) is different from the polarity of the first pre-charge signal Vp1(k).

When focusing attention on an image signal Isig supplied to a source line S in the last drive period Pdj(N) of the display period Pdj and a first pre-charge signal Vp1 supplied to the same source line S in the first pre-charge period Ppr1 following the display period Pdj (drive period Pdj(N)), the absolute value of a difference between the voltage value of the common drive signal Vcom and the voltage value of the first pre-charge signal Vp1 is greater than or equal to the absolute value of a difference between the voltage value of the common drive signal Vcom and the voltage value of the image signal Isig.

In the second pre-charge period Ppr2, input of the control signals SG to the gate lines G is suspended. All the pixel switching elements PSW are thereby maintained in the non-conductive state. The drive IC chip IC1 executes time-division drive of a plurality of source lines S including the source lines S(k−3) to S(k+2) by the control signals SELR, SELG and SELB, the source line drive circuit SD outputs a plurality of second pre-charge signals Vp2 including second pre-charge signals Vp2(k−3) to Vp2(k+2), the common electrode drive circuit CD supplies the common drive signal Vcom to a plurality of divisional electrodes CA including the divisional electrode CA(h) and the divisional electrode CA(h−1), and the liquid crystal display panel PNL is thereby driven.

Second pre-charge signals Vp2(k−2), Vp2(k) and Vp2(k+2) having the positive polarity are supplied to the source lines. S(k−2), S(k) and S(k+2), and second pre-charge signals Vp2(k−3), Vp2(k−1) and Vp2(k+1) having the negative polarity are supplied to the source lines S(k−3), S(k−1) and S(k+1). Second pre-charge signals Vp2 having corresponding polarities are also supplied to the other source lines S than the source line S(k−3) to S(k+2).

When focusing attention on the first pre-charge signals Vp1(k−3) to Vp1(k+2) and the second pre-charge signal Vp2(k−3) to Vp2(k+2), the polarity of the first pre-charge signal Vp1(k−2) is the same as the polarity of the second pre-charge signal Vp2(k−2), the polarity of the first pre-charge signal Vp1(k−1) is the same as the polarity of the second pre-charge signal Vp2(k−1), the polarity of the first pre-charge signal Vp1(k+1) is the same as the polarity of the second pre-charge signal Vp2(k+1), and the polarity of the first pre-charge signal Vp1(k+2) is the same as the polarity of the second pre-charge signal Vp2(k+2).

In contrast, the polarity of the first pre-charge signal Vp1(k−3) is different from the polarity of the second pre-charge signal Vp2(k−3), and the polarity of the first pre-charge signal Vp1(k) is different from the polarity of the second pre-charge signal Vp2(k).

When focusing attention on an image signal Isig supplied to a source line S in the last drive period Pdj(N) of the display period Pdj, an image signal Isig supplied to the same source line S in the first drive period Pdj+1(N−3) of the display period Pdj+1, and a second pre-charge signal Vp2 supplied to the same source line S in the second pre-charge period Ppr2 between the drive period Pdj(N) and the drive period Pdj+1(N−3), the voltage value of the second pre-charge signal Vp2 is equal to either the voltage value of the image signal Isig in the drive period Pdj(N) or the voltage value of the image signal Isig in the drive period Pdj+1(N−3). In the example, the voltage value of the second pre-charge signal Vp2 is equal to the voltage value of the image signal Isig in the drive period Pdj+1(N−3).

In the example, the liquid crystal display panel PNL may be driven without providing the second pre-charge period Ppr2. In other words, the liquid crystal display panel PNL may be driven without providing second pre-charge drive. In this case, the first drive module (drive IC chip IC1 and gate line drive circuit GD) and the second drive module (touch detection IC chip IC2) repeat display drive executed in a display period Pd, first pre-charge drive executed in a first pre-charge period Ppr1 and sense drive executed in a sense period Ps for m times in the F-frame period.

COMPARATIVE EXAMPLE

Next, a liquid crystal display device and a method of driving the same of the comparative example are described.

Figure 14:
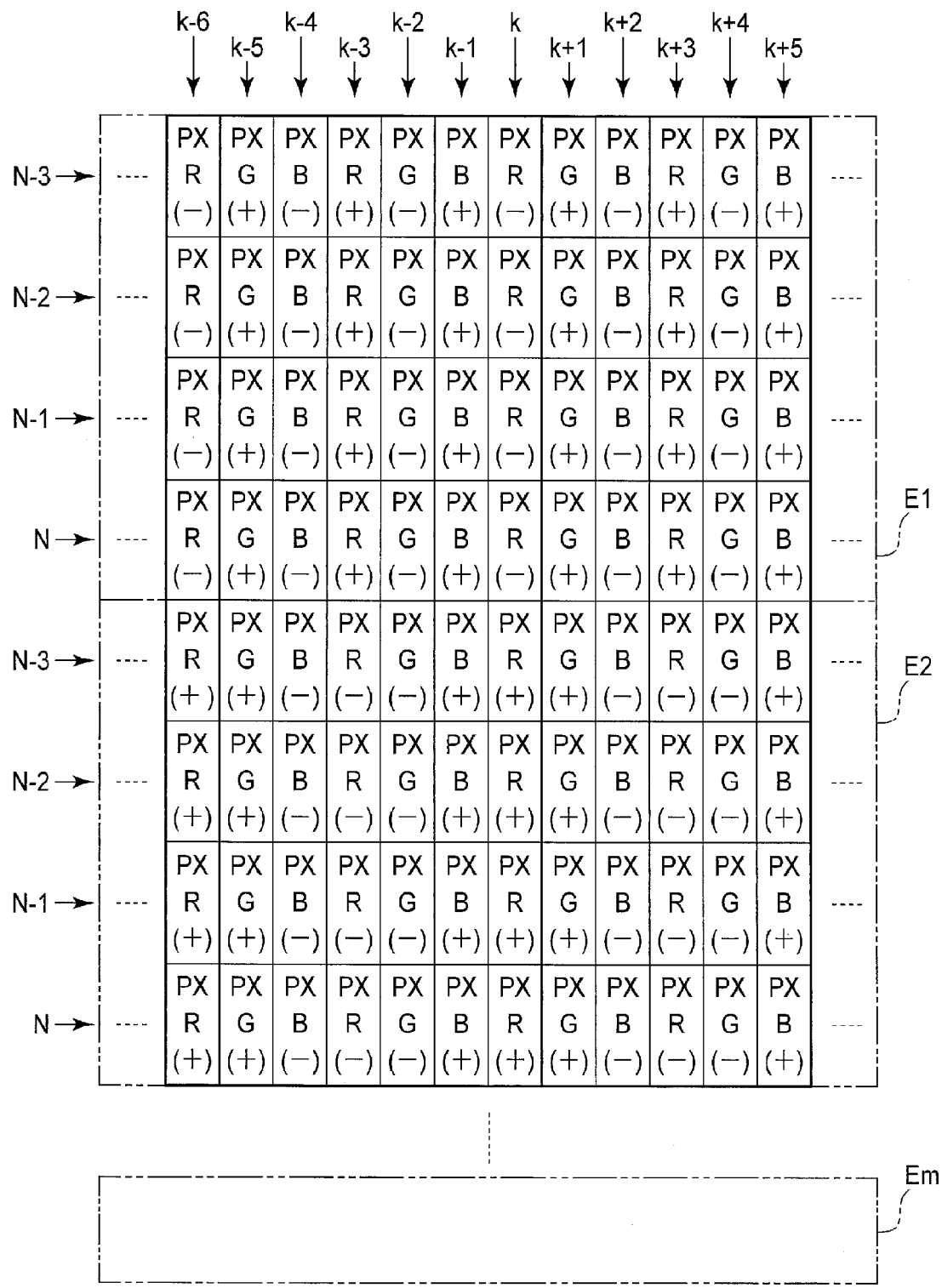
FIG. 14 is an illustration partially showing pixels, colors expressed by the pixels and polarities of the pixels in an arbitrary $F^{th}$ frame period in a comparative example of the embodiment.

FIG. 14 is an illustration partially showing pixels PX, colors expressed by the pixels PX and polarities of the pixels PX (pixel electrodes) in the F-frame period in the comparative example. FIG. 15 is an illustration partially showing the pixels PX, colors expressed by the pixels PX and polarities of the pixels PX (pixel electrodes) in the F+1 frame period in the comparative example.

As shown in FIG. 14 and FIG. 15, the method of driving the liquid crystal display device of the comparative example is based on the column inversion drive method, but the polarity of an image signal supplied to pixel electrodes of red pixels PX of an odd-numbered target E is different from the polarity of an image signal supplied to pixel electrodes of red pixels PX of an even-numbered target E. That is, the polarity of the image signal supplied to pixel electrodes of red pixels PX is inverted per target E.

In both the F-frame period and the F+1 frame period, the polarity of pixel electrodes of pixels PX of a first target E1 (odd-numbered target E) is inverted in each column, but the polarity of pixel electrodes of pixels PX of a second target E2 (even-numbered target E) is inverted in units of three columns.

FIG. 16 is a circuit diagram showing pixels PX of an arbitrarily $j^{th}$ target Ej and a $j+1^{th}$ target Ej+1 in arbitrary six columns in the comparative example, and showing eight gate lines G, six source line S, a plurality of pixel switching elements PSW, a plurality of pixel electrodes PE and two divisional electrodes CA.

As shown in FIG. 16, the positional relationship between the source lines S and the divisional electrodes CA and the relation of electrical connection between the gate lines G, the source lines S, the pixel switching elements PSW and the pixel electrodes PE are the same as those in the above example.

Next, the method of driving the liquid crystal display device of the comparative example is described.

The comparative example is different from the example mainly in that a third pre-charge period is provided instead of the first and second pre-charge periods of the example. The third pre-charge period is provided following a sense period and preceding a display period. The source lines S are driven during the third pre-charge period. A source line S located in the slit between the divisional electrodes CA is driven with a polarity opposite to the polarity in the preceding display period. With reference to FIG. 16, a positive polarity image signal Isig(k) is supplied to the source line S(k) and a negative polarity image signal Isig(k−1) is supplied to the source line S(k−1) in a display period for the $j^{th}$ target Ej, a negative polarity third pre-charge signal Vp3(k) is supplied to the source line S(k) and a negative polarity third pre-charge signal Vp3(k−1) is supplied to the source line S(k−1) in the following third pre-charge period, and a negative polarity image signal Isig(k) is supplied to the source line S(k) and a negative polarity image signal Isig(k−1) is supplied to the source line S(k−1) in the following display period for the $j+1^{th}$ target Ej+1.

Since a period during which an unnecessary electric field is leaked from the source line S(k) to liquid crystal of the pixels PX in the k−$1^{th}$ column is reduced, an alignment failure of the liquid crystal molecules can be prevented.

In the comparative example, the above-described polarity inversion drive in units of target E is executed for all the source line S connected to pixels PX for red display (source line S(k−3), source line S(k), etc.).

Figure 17:
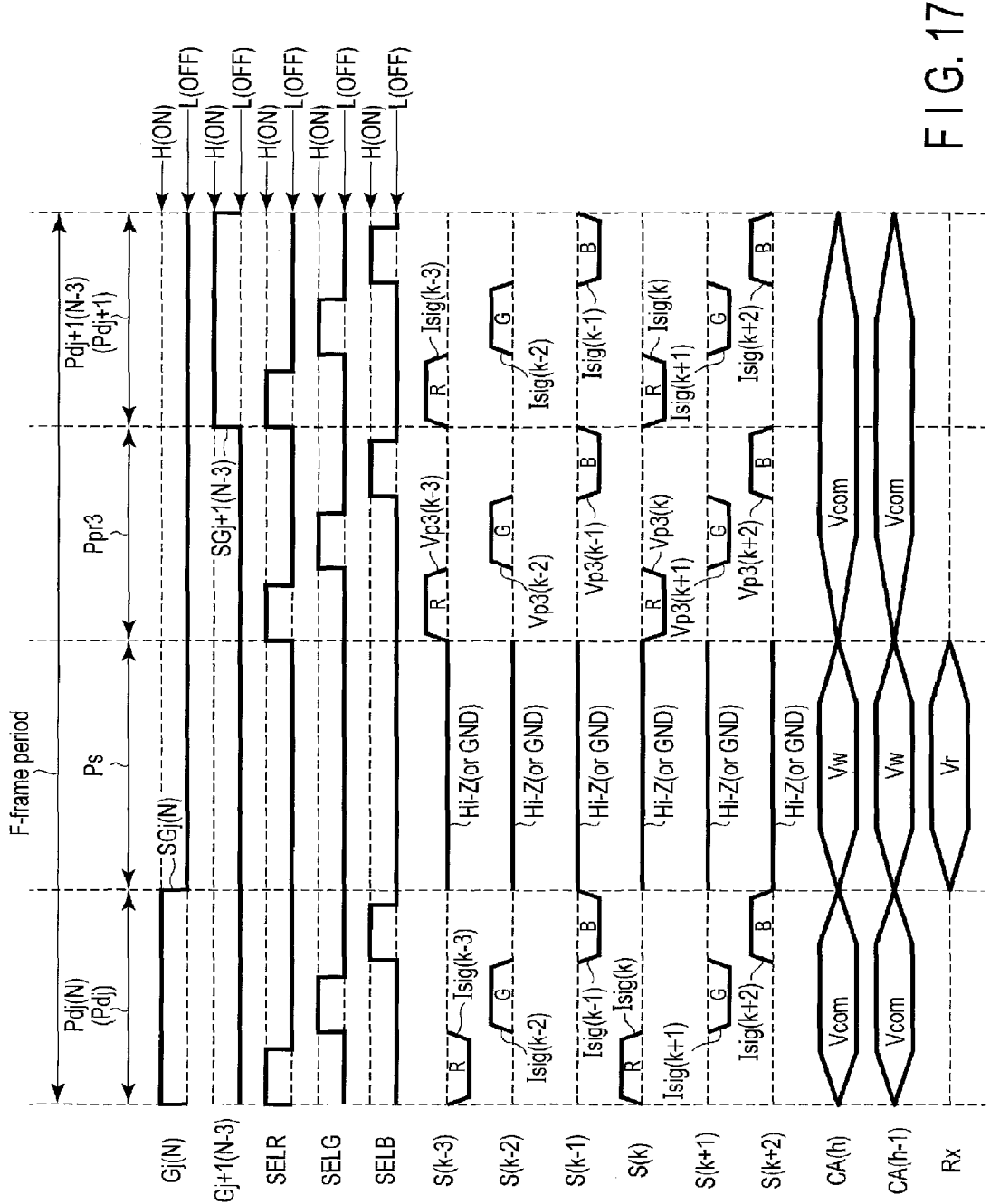
FIG. 17 is a timing chart showing a method of driving the liquid crystal display device of the comparative example and showing various control signals, image signals, third pre-charge signals, a common drive signal, a write signal and a read signal in a part of the $F^{th}$ frame period.

FIG. 17 is a timing chart showing the method of driving the liquid crystal display device of the comparative example and showing various control signals SG and SEL, image signals Isig, third pre-charge signals Vp3, a common drive signal Vcom, a write signal Vw and a read signal Vr in a part of the F-frame period.

The F-frame period includes m display periods Pd, m sense periods Ps and m third pre-charge periods Ppr3. Therefore, the first drive module (drive IC chip IC1 and gate line drive circuit GD) and the second drive module (touch detection IC chip IC2) repeat display drive executed in a display period Pd, sense drive executed in a sense period Ps and third pre-charge drive executed in a third pre-charge period Ppr3 for m times in the F-frame period.

FIG. 17 shows a part of a display period (first display period) Pdj for the $j^{th}$ target Ej, a sense period Ps following the display period Pdj, a third pre-charge period Ppr3 following the sense period Ps and a part of a display period (second display period) Pdj+1 for the $j+1^{th}$ target Ej+1 following the third pre-charge period Ppr3 of the F-frame period. A method of driving the liquid crystal display device from the drive period Pdj(N) to the drive period Pdj+1(N−3) is mainly described.

As shown in FIG. 17 and FIG. 16, the sense period Ps and the third pre-charge period Ppr3 are blanking periods during which drive of all the gate lines G is suspended. The sense period Ps is a blanking period during which drive of all the gate lines G and all the source lines S is suspended. In each sense period Ps, one or more divisional electrodes CA can be a target of sense drive.

Drive of the liquid crystal display panel PNL in the display period Pdj is the same as that in the example.

Drive of the liquid crystal display panel PNL in the display period Pdj+1 following the display period Pdj is different from that in the example in that the polarity of the image signal Isig(k−3) in the display period Pdj is different from the polarity of the image signal Isig(k−3) in the display period Pdj+1, and the polarity of the image signal Isig(k) in the display period Pdj is different from the polarity of the image signal Isig(k) in the display period Pdj+1. That is, the polarity of the image signal Isig supplied to source lines S for red pixels PX is different for each display period Pd.

Drive of the liquid crystal display panel PNL and the sensor SE in the sense period Ps is substantially the same as that in the example. In the sense period Ps of the comparative example, the drive IC chip IC1 maintains all the control switching elements CSW in the non-conductive state by the control signals SELR, SELG and SELB, and makes all the source lines S have high impedance. Alternatively, the drive IC chip IC1 maintains all the control switching elements CSW in the conductive state by the control signals SELR, SELG and SELB, and fixes all the source lines S to ground potential (GND).

Drive of the liquid crystal display panel PNL in the third pre-charge period Ppr3 is substantially the same as drive of the liquid crystal display panel PNL in the first pre-charge period Ppr1 in the example.

When focusing attention on an image signal Isig supplied to a source line S in the last drive period Pdj(N) of the display period Pdj and a third pre-charge signal Vp3 supplied to the same source line S in the third pre-charge period Ppr3 between the display period Pdj (drive period Pdj(N)) and the display period Pdj+1 (drive period Pdj+1(N−3)), for example, the absolute value of a difference between the voltage value of the common drive signal Vcom and the voltage value of the image signal Isig is equal to the absolute value of a difference between the voltage value of the common drive signal Vcom and the voltage value of the third pre-charge signal Vp3.

The third pre-charge period Ppr3 is provided, for example, in order to improve a variation with time of potential of the source lines S. For example, time required for writing the image signals Isig to the source lines S in the drive period Pdj+1(N−3) can be reduced.

According to the liquid crystal display device DSP and the method of driving the same of the embodiment, the liquid crystal display device DSP has the structure corresponding to the fringe field switching (FFS) mode and the common electrode CE comprises the divisional electrodes CA formed in the shape of strips along the source lines S. The column inversion drive method is used in the liquid crystal display device DSP. The image signals Isig are written to the pixel electrodes PE except a period for sense drive, etc., for each target E. In order to reduce deterioration of the aperture ratio of the pixels PX, some of the source lines S are located between the divisional electrodes CA.

The F-frame period includes the display period Pdj, the first pre-charge period Ppr1, the sense period Ps and the display period Pdj+1. The first drive module (drive IC chip IC1 and gate line drive circuit GD) supplies the source line S(k) with the image signal Isig(k) having the positive polarity in the display period Pdj, the first pre-charge signal Vp1(k) having the negative polarity in the first pre-charge period Ppr1, and the image signal Isig(k) having the positive polarity in the display period Pdj+1.

A leak of an unnecessary electric field from the source line S(k) to liquid crystal of the pixels PX of the $j^{th}$ target Ej in the k−$1^{th}$ column can be prevented. An alignment failure of the liquid crystal molecules and a display failure such as vertical crosstalk can be avoided.

In every target E, the polarity of pixels PX (pixel electrodes PE) is inverted in each column. Since blocks whose polarity is inverted in each column and blocks whose polarity is inverted in units of columns are not alternately generated, non-uniformity in display in a block unit can be prevented from being visually identified.

The number of inversions of the polarity of each source line S in the example is greater than that in the comparative example, but N is not less than three in the example. Therefore, power consumption can be reduced in the example in comparison with the case where N is not more than two. In addition, power consumption can be reduced in the example in comparison with the case using a dot-inversion drive method. If the dot-inversion drive method is used, positive polarity pixels PX (pixel electrode PE) and negative polarity pixels PX (pixel electrode PE) are formed in a checkerboard pattern and the polarity of each pixel PX (pixel electrode PE) is inverted per frame period.

When focusing attention on an image signal Isig supplied to a source line S in the drive period Pdj(N) and a first pre-charge signal Vp1 supplied to the same source line S in the first pre-charge period Ppr1 following the drive period Pdj(N), the absolute value of a difference between the voltage value of the common drive signal Vcom and the voltage value of the first pre-charge signal Vp1 should preferably be greater than or equal to the absolute value of a difference between the voltage value of the common drive signal Vcom and the voltage value of the image signal Isig. A display failure such as vertical crosstalk can thereby be further reduced.

The F-frame period further includes a second pre-charge period Ppr2. Therefore, for example, the variation with time of potential of the source lines S can be improved. In other words, time required for writing the image signals Isig to the source lines S in the drive period Pdj+1(N−3) can be shortened.

When focusing attention on an image signal Isig supplied to a source line S in the drive period Pdj(N), an image signal Isig supplied to the same source line S in the drive period Pdj+1(N−3), and a second pre-charge signal Vp2 supplied to the same source line S in the second pre-charge period Ppr2, the voltage value of the second pre-charge signal Vp2 should preferably be equal to either the voltage value of the image signal Isig in drive period Pdj(N) or the voltage value of the image signal Isig in the drive period Pdj+1(N−3). The second pre-charge signal Vp2 can thereby be generated easily. In the sense period Ps, all the control switching elements CSW are maintained in the non-conductive state. The variation with time of potential of the source lines S can be reduced by fixing the source lines S in the electrically floating state.

In addition, a parasitic capacitance (floating capacitance) unnecessarily produced between the common electrode CE and the source lines S can be reduced by fixing the source lines S in the electrically floating state in the sense period Ps. That is, the resistance of the common electrode CE can be reduced and, for example, a write signal Vw can be written to the common electrode CE at high speed. Therefore, the speed or accuracy of sensing by the sensor SE can be improved.

For the above reason, the liquid crystal display device DSP having high display quality and the method of driving the liquid crystal display device DSP can be achieved. Alternatively, the liquid crystal display device DSP capable of reducing power consumption and the method of driving the liquid crystal display device DSP can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first drive module is not limited to the drive IC chip IC1 and the gate line drive circuit GD and can be variously changed as long as the first drive module can supply the common drive signal Vcom and the write signal Vw to the divisional electrodes CA, supply the image signals Isig, the first pre-charge signals Vp1 and the second pre-charge signals Vp2 to the source lines S and supply the control signals SG to the gate lines G.

The second drive module is not limited to the touch detection IC chip 102 and can be variously changed as long as the second drive module can read the read signal Vr from the detection electrodes Rx.

The lead lines L and the detection electrodes Rx may be provided on the side of the inner surface of the second insulating substrate 20 (i.e., the side of the surface of the second insulating substrate 20 opposed to the first substrate SUB1). Alternatively, the lead lines L and the detection electrodes Rx may be provided above the inner surface of the first insulating substrate 10 (i.e., the surface opposed to the second substrate SUB2). That is, the lead lines L and the detection electrodes Rx may be provided in any layer of a layered structure including the liquid crystal display panel PNL and a cover of the liquid crystal display panel PNL.

If the lead lines L, the detection electrodes Rx, etc., are located between the first insulating substrate 10 and the second insulating substrate 20, the drive IC chip IC1 and the touch detection IC chip IC2 may be integrally formed. In other words, the drive IC chip IC1 and the touch detection IC chip 102 may be integrated on the single drive IC chip (drive module). In this case, the single drive IC chip is connected to the liquid crystal display panel PNL and the control module CM. The single drive IC chip is further connected to the sensor SE (lead lines L) through lines and electrodes formed on the liquid crystal display panel PNL.

In the embodiment, the liquid crystal display device DSP and the method of driving the same are disclosed as an example. However, the embodiment can be applied to various liquid crystal display devices and their drive methods. It is needless to say that the embodiment can be applied to middle or small liquid crystal display devices and large liquid crystal display devices without particular limitation.

What is claimed is:
1. A liquid crystal display device comprising:
a first substrate comprising a common electrode including a first divisional electrode and a second divisional electrode arranged with a space between, and a first source line located between the first divisional electrode and the second divisional electrode;

a second substrate opposed to the first substrate;

a liquid crystal layer held between the first substrate and the second substrate; and a first drive module electrically connected to the first divisional electrode, the second divisional electrode and the first source line, wherein one frame period includes a first display period, a second display period following the first display period, a sense period between the first display period and the second display period, and a first pre-charge period between the first display period and the sense period, in the first display period, the first drive module supplies a common drive signal to the first divisional electrode and the second divisional electrode and supplies a first image signal having a first polarity to the first source line, in the first pre-charge period, the first drive module supplies the common drive signal to the first divisional electrode and the second divisional electrode and supplies a first pre-charge signal having a second polarity, which is different from the first polarity, to the first source line, in the sense period, the first drive module supplies a sensor drive signal to at least one of the first divisional electrode and the second divisional electrode, and in the second display period, the first drive module supplies the common drive signal to the first divisional electrode and the second divisional electrode and supplies the first image signal having the first polarity to the first source line.

2. The liquid crystal display device of claim 1, wherein the first substrate further comprises:

N gate lines of a first target which cross the first source line and are electrically connected to the first drive module;

N gate lines of a second target which cross the first source line and are electrically connected to the first drive module;

N first pixel switching elements of the first target which are electrically connected to the first source line and are electrically connected to the gate lines of the first target, respectively;

N first pixel switching elements of the second target which are electrically connected to the first source line and are electrically connected to the gate lines of the second target, respectively;

N first pixel electrodes of the first target which are electrically connected to the first pixel switching elements of the first target, respectively; and N first pixel electrodes of the second target which are electrically connected to the first pixel switching elements of the second target, respectively, wherein N is a natural number not less than three and not more than one hundred, in the first display period, the first drive module further supplies a control signal sequentially to the gate lines of the first target, sequentially switches the first pixel switching elements of the first target from a non-conductive state to a conductive state, and maintains all the first pixel switching elements of the second target in the non-conductive state, in the first pre-charge period, the first drive module maintains all the first pixel switching elements in the non-conductive state, in the sense period, the first drive module maintains all the first pixel switching elements in the non-conductive state, and in the second display period, the first drive module further supplies the control signal sequentially to the gate lines of the second target, sequentially switches the first pixel switching elements of the second target from the non-conductive state to the conductive state, and maintains all the first pixel switching elements of the first target in the non-conductive state.

3. The liquid crystal display device of claim 1, wherein absolute value of a difference between a voltage value of the common drive signal and a voltage value of the first pre-charge signal is greater than or equal to absolute value of a difference between the voltage value of the common drive signal and a voltage value of the first image signal supplied at an end of the first display period.

4. The liquid crystal display device of claim 1, wherein the frame period further includes a second pre-charge period between the sense period and the second display period, in the second pre-charge period, the first drive module supplies the common drive signal to the first divisional electrode and the second divisional electrode and supplies a second pre-charge signal to the first source line, and a voltage value of the second pre-charge signal is equal to any one of a voltage value of the first image signal supplied at an end of the first display period and a voltage value of the first image signal supplied at a beginning of the second display period.

5. The liquid crystal display device of claim 1, wherein the first substrate further comprises a second source line adjacent to the first source line with a space between, opposed to the second divisional electrode and electrically connected to the first drive module, in the first display period, the first drive module further supplies a second image signal having the second polarity to the second source line, in the first pre-charge period, the first drive module further supplies the first pre-charge signal having the second polarity to the second source line, and in the second display period, the first drive module supplies the second image signal having the second polarity to the second source line.

6. The liquid crystal display device of claim 5, wherein the first substrate further comprises:

N gate lines of a first target which cross the first source line and the second source line and are electrically connected to the first drive module;

N gate lines of a second target which cross the first source line and the second source line and are electrically connected to the first drive module;

N first pixel switching elements of the first target which are electrically connected to the first source line and are electrically connected to the gate lines of the first target, respectively;

N first pixel switching elements of the second target which are electrically connected to the first source line and are electrically connected to the gate lines of the second target, respectively;

N second pixel switching elements of the first target which are electrically connected to the second source line and are electrically connected to the gate lines of the first target, respectively;

N second pixel switching elements of the second target which are electrically connected to the second source line and are electrically connected to the gate lines of the second target, respectively;

N first pixel electrodes of the first target which are electrically connected to the first pixel switching elements of the first target, respectively;

N first pixel electrodes of the second target which are electrically connected to the first pixel switching elements of the second target, respectively;

N second pixel electrodes of the first target which are electrically connected to the second pixel switching elements of the first target, respectively; and N second pixel electrodes of the second target which are electrically connected to the second pixel switching elements of the second target, respectively, wherein N is a natural number not less than three and not more than one hundred, in the first display period, the first drive module further supplies a control signal sequentially to the gate lines of the first target, sequentially switches the first pixel switching elements and the second pixel switching elements of the first target from a non-conductive state to a conductive state, and maintains all the first pixel switching elements and all the second pixel switching elements of the second target in the non-conductive state, in the first pre-charge period, the first drive module maintains all the first pixel switching elements and all the second pixel switching elements in the non-conductive state, in the sense period, the first drive module maintains all the first pixel switching elements and all the second pixel switching elements in the non-conductive state, and in the second display period, the first drive module further supplies the control signal sequentially to the gate lines of the second target, sequentially switches the first pixel switching elements and the second pixel switching elements of the second target from the non-conductive state to the conductive state, and maintains all the first pixel switching elements and all the second pixel switching elements of the first target in the non-conductive state.

7. The liquid crystal display device of claim 1, further comprising a control switching element connected between the first source line and the first drive module, wherein in the sense period, the first drive module maintains the control switching element in a non-conductive state.

8. The liquid crystal display device of claim 1, further comprising:
a detection electrode; and
a second drive module electrically connected to the detection electrode,
wherein the second drive module reads a read signal from the detection electrode in the sense period, and
the read signal indicates a variation in a sensor signal generated between the detection electrode and at least one of the first divisional electrode and the second divisional electrode.

9. A method of driving a liquid crystal display device, the liquid crystal display device comprising:
a first substrate comprising a common electrode including a first divisional electrode and a second divisional electrode arranged with a space between, and a first source line located between the first divisional electrode and the second divisional electrode;
a second substrate opposed to the first substrate; and
a liquid crystal layer held between the first substrate and the second substrate,
the method comprising:
in a first display period, supplying a common drive signal to the first divisional electrode and the second divisional electrode and supplying a first image signal having a first polarity to the first source line;
in a first pre-charge period, supplying the common drive signal to the first divisional electrode and the second divisional electrode and supplying a first pre-charge signal having a second polarity, which is different from the first polarity, to the first source line;
in a sense period, supplying a sensor drive signal to at least one of the first divisional electrode and the second divisional electrode; and
in a second display period, supplying the common drive signal to the first divisional electrode and the second divisional electrode and supplying the first image signal having the first polarity to the first source line,
wherein one frame period includes the first display period, the second display period following the first display period, the sense period between the first display period and the second display period, and the first pre-charge period between the first display period and the sense period.

* * * * *